(12) United States Patent
Fly et al.

(10) Patent No.: US 7,861,744 B2
(45) Date of Patent: Jan. 4, 2011

(54) TUBULAR EXPANSION DEVICE AND METHOD OF FABRICATION

(75) Inventors: Charles B. Fly, League City, TX (US); Gerald W. Fly, Geneseo, NY (US); Kenneth W. Walker, Houston, TX (US)

(73) Assignee: Expansion Technologies, League City, TX (US)

( * ) Notice: Subject to any disclaimer, the term of this patent is extended or adjusted under 35 U.S.C. 154(b) by 0 days.

(21) Appl. No.: 11/954,942

(22) Filed: Dec. 12, 2007

(65) Prior Publication Data
US 2009/0126436 A1    May 21, 2009

Related U.S. Application Data

(60) Provisional application No. 60/874,378, filed on Dec. 12, 2006.

(51) Int. Cl.
*F16L 55/12* (2006.01)

(52) U.S. Cl. .............. 138/98; 138/93; 166/384; 166/101; 166/187; 72/370.07; 72/58

(58) Field of Classification Search .......... 138/93, 138/98; 166/384, 101, 187; 72/58, 370.06, 72/370.07, 370.08
See application file for complete search history.

(56) References Cited

U.S. PATENT DOCUMENTS

| | | | | |
|---|---|---|---|---|
| 2,875,787 | A | * | 3/1959 | Evans ........................ 138/30 |
| 3,028,915 | A | * | 4/1962 | Jennings .................... 166/277 |
| 3,167,122 | A | | 1/1965 | Lang |
| 3,179,168 | A | | 4/1965 | Vincent |
| 3,338,310 | A | * | 8/1967 | McGill ....................... 166/128 |
| RE30,802 | E | | 11/1981 | Rogers, Jr. |
| 4,368,571 | A | | 1/1983 | Cooper, Jr. |
| 4,420,016 | A | * | 12/1983 | Nichols ...................... 138/103 |
| 4,467,835 | A | * | 8/1984 | Champleboux .............. 138/93 |
| 5,009,002 | A | | 4/1991 | Kelly |
| 5,119,862 | A | * | 6/1992 | Maimets et al. ............. 138/98 |
| 5,236,201 | A | | 8/1993 | Vance, Sr. et al. |
| 5,301,424 | A | | 4/1994 | Snyder |
| 5,327,962 | A | * | 7/1994 | Head .......................... 277/334 |

(Continued)

OTHER PUBLICATIONS

International Search Report, PCT Application No. PCT/US07/87253.

*Primary Examiner*—James F Hook
(74) *Attorney, Agent, or Firm*—Nutter McClennen & Fish LLP; David J. Powsner; Christopher J. Stow

(57) ABSTRACT

The invention comprises a device for expanding tubular members to a controlled diameter and its method of fabrication. The device includes an expandable bladder held in a convoluted form. After the device is inserted into a cylindrical tube to be evenly expanded, the bladder is expanded by hydraulic pressure to a controlled maximum diameter. It is then deflated so the device can then be moved to another location and reused. The bladder is formed from a flexible impervious material having integral reinforcing fibers. It is initially formed in a fully expanded configuration over a convoluted mandrel and a removable cylindrical shell. When the shell is removed vacuum or external pressure draws the bladder against the mandrel. The bladder is overmolded with a resilient cover to hold it in reduced form until pressurized. The bladder cover prevents the bladder from kinking during the expansion.

27 Claims, 27 Drawing Sheets

U.S. PATENT DOCUMENTS

| | | | |
|---|---|---|---|
| 5,469,919 A * | 11/1995 | Carisella | 166/387 |
| 5,785,120 A | 7/1998 | Smalley et al. | |
| 5,833,001 A | 11/1998 | Song et al. | |
| 6,007,067 A | 12/1999 | Hiorth | |
| 6,019,136 A * | 2/2000 | Walsh et al. | 138/98 |
| 6,029,748 A | 2/2000 | Forsyth et al. | |
| 6,041,863 A * | 3/2000 | Lindsey | 166/311 |
| 6,073,692 A * | 6/2000 | Wood et al. | 166/187 |
| 7,077,196 B2 * | 7/2006 | Rudd | 166/207 |
| 7,111,680 B2 * | 9/2006 | Duggan | 166/207 |
| 2003/0221840 A1 * | 12/2003 | Whitelaw et al. | 166/380 |

\* cited by examiner

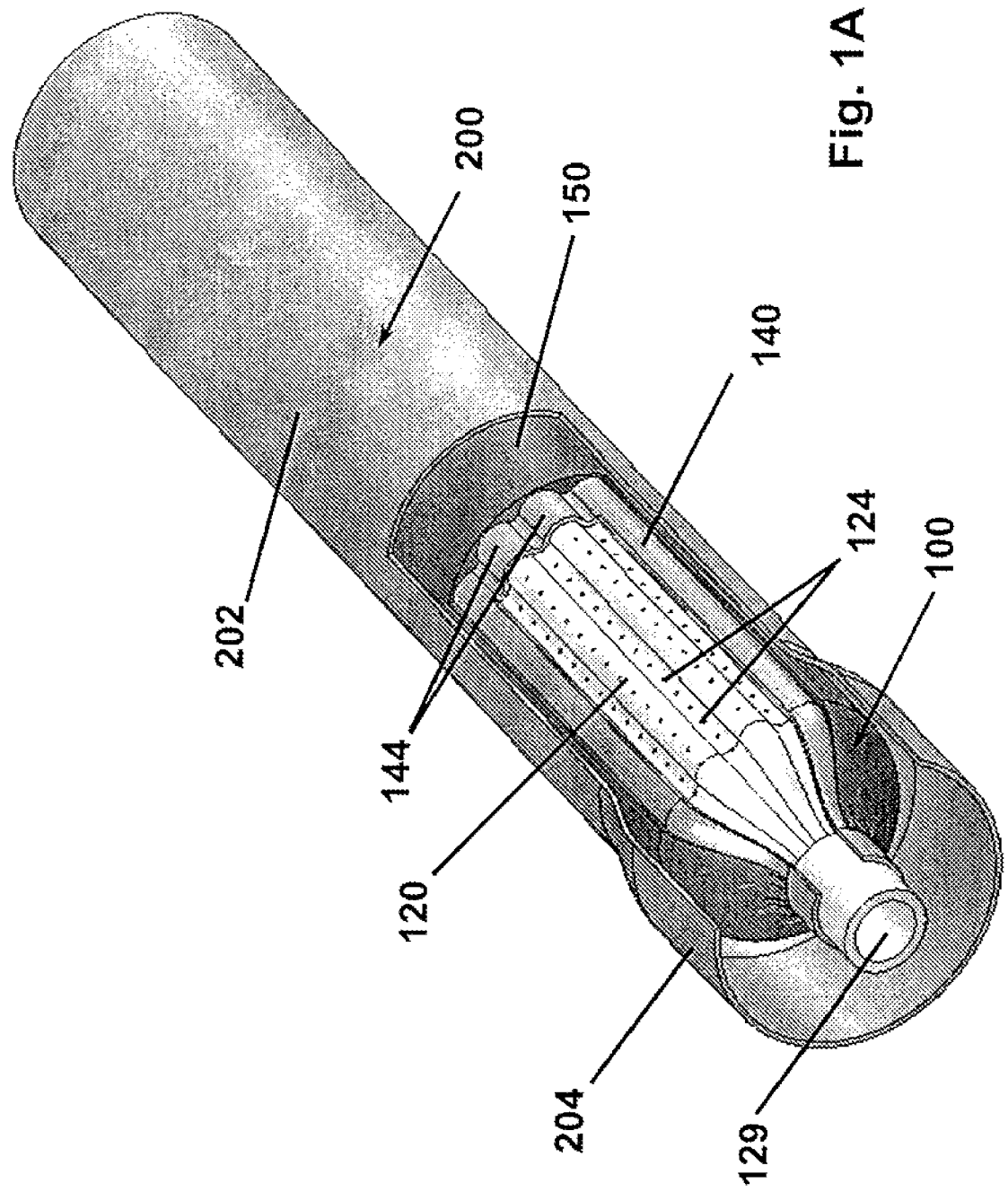

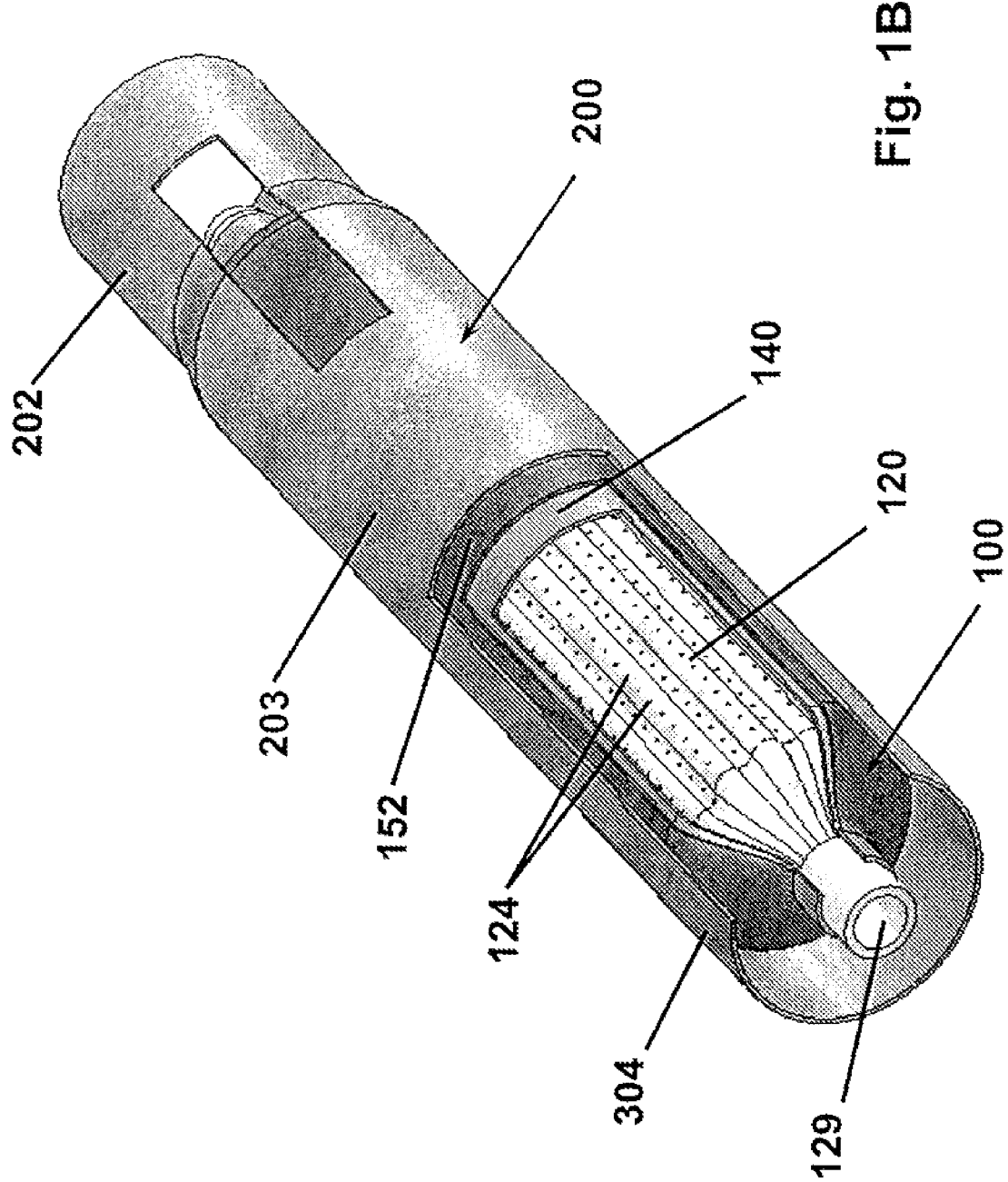

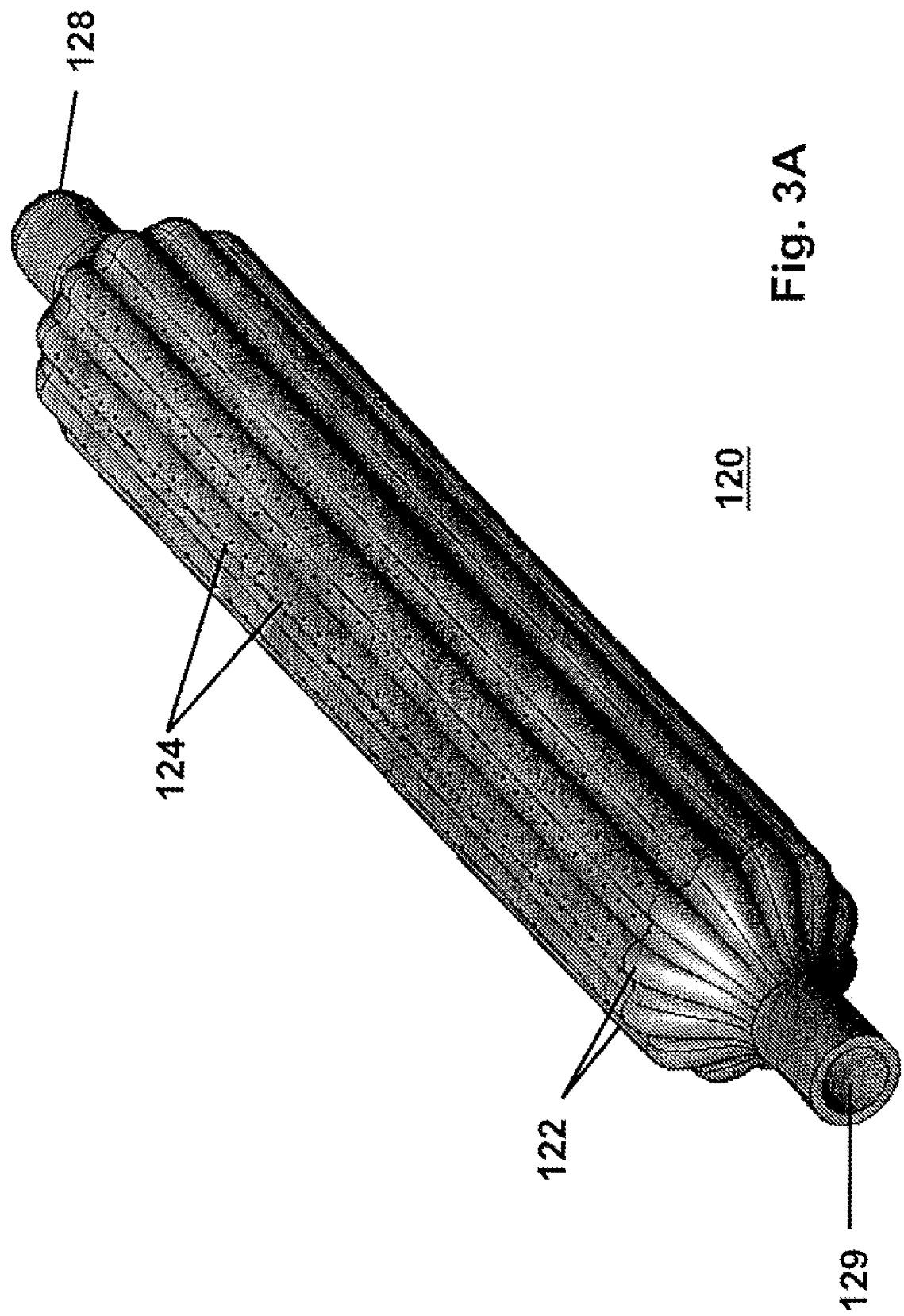

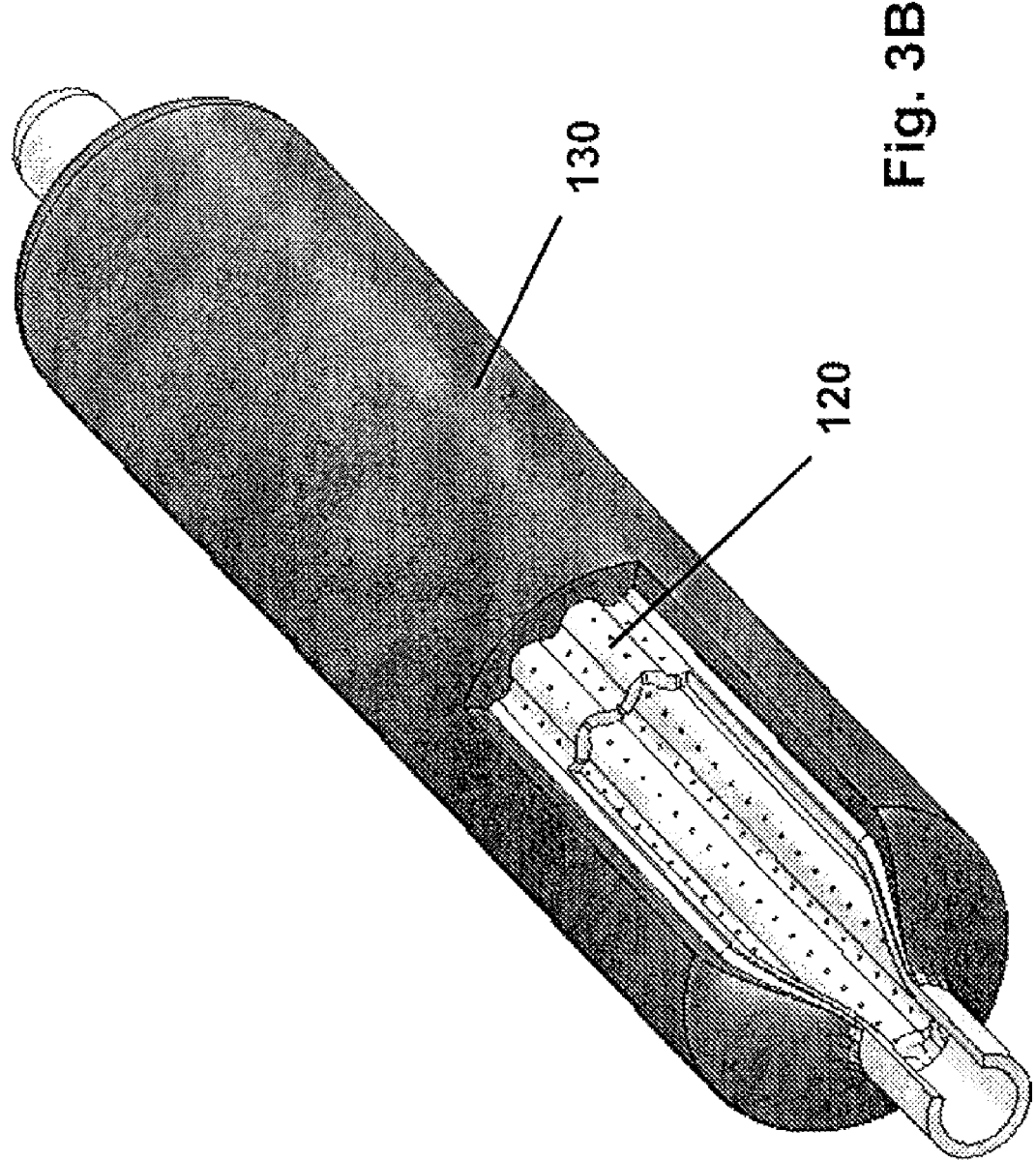

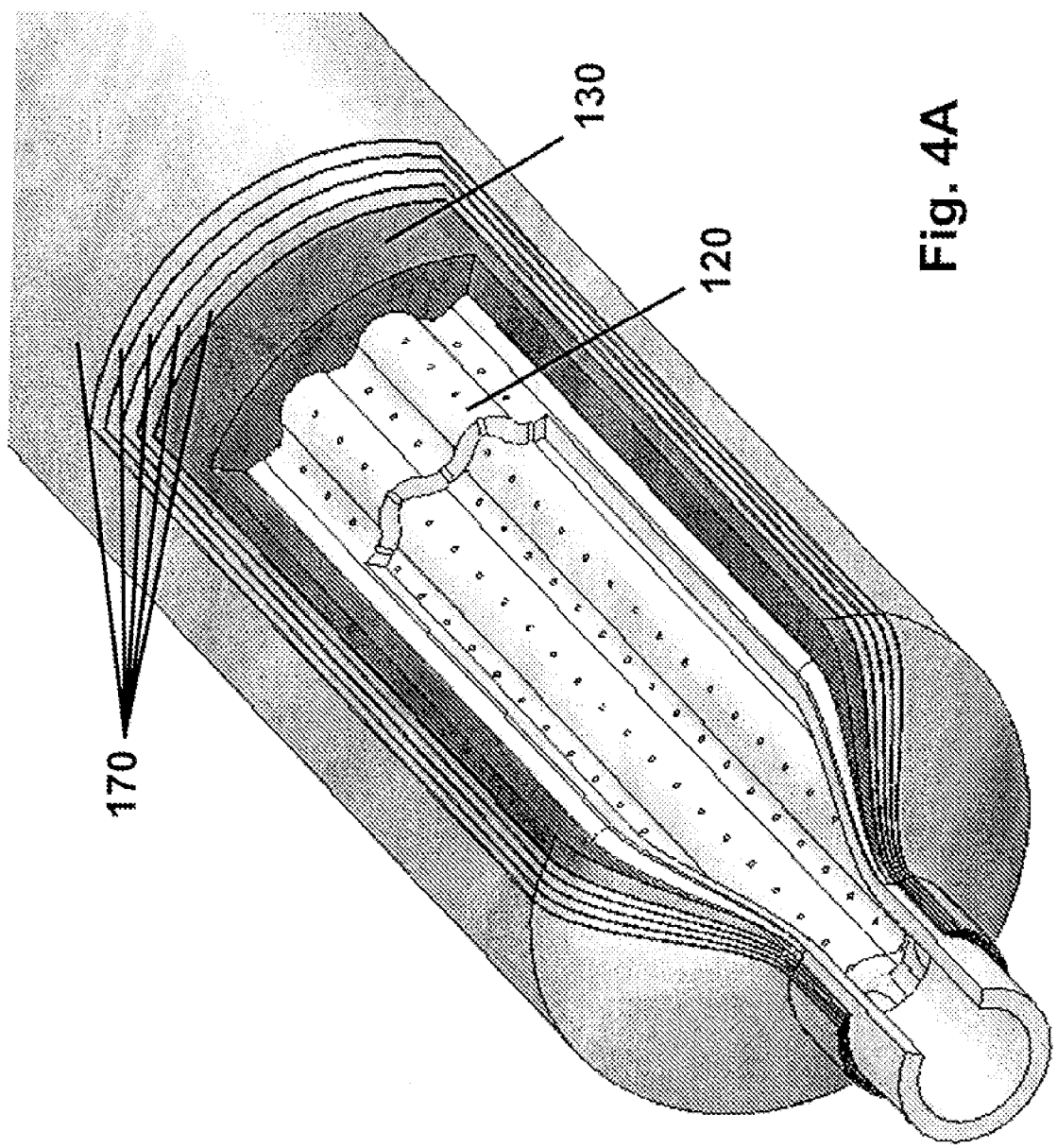

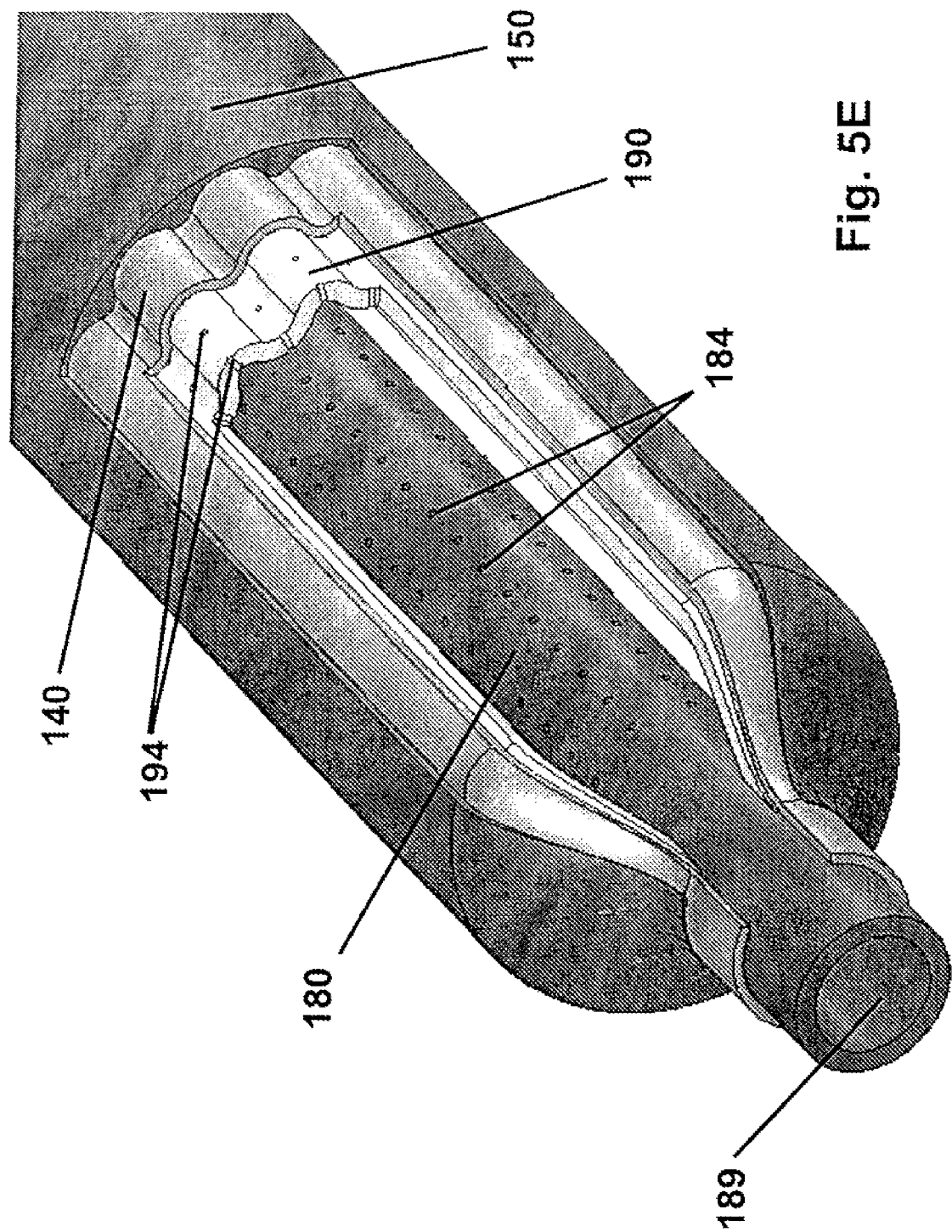

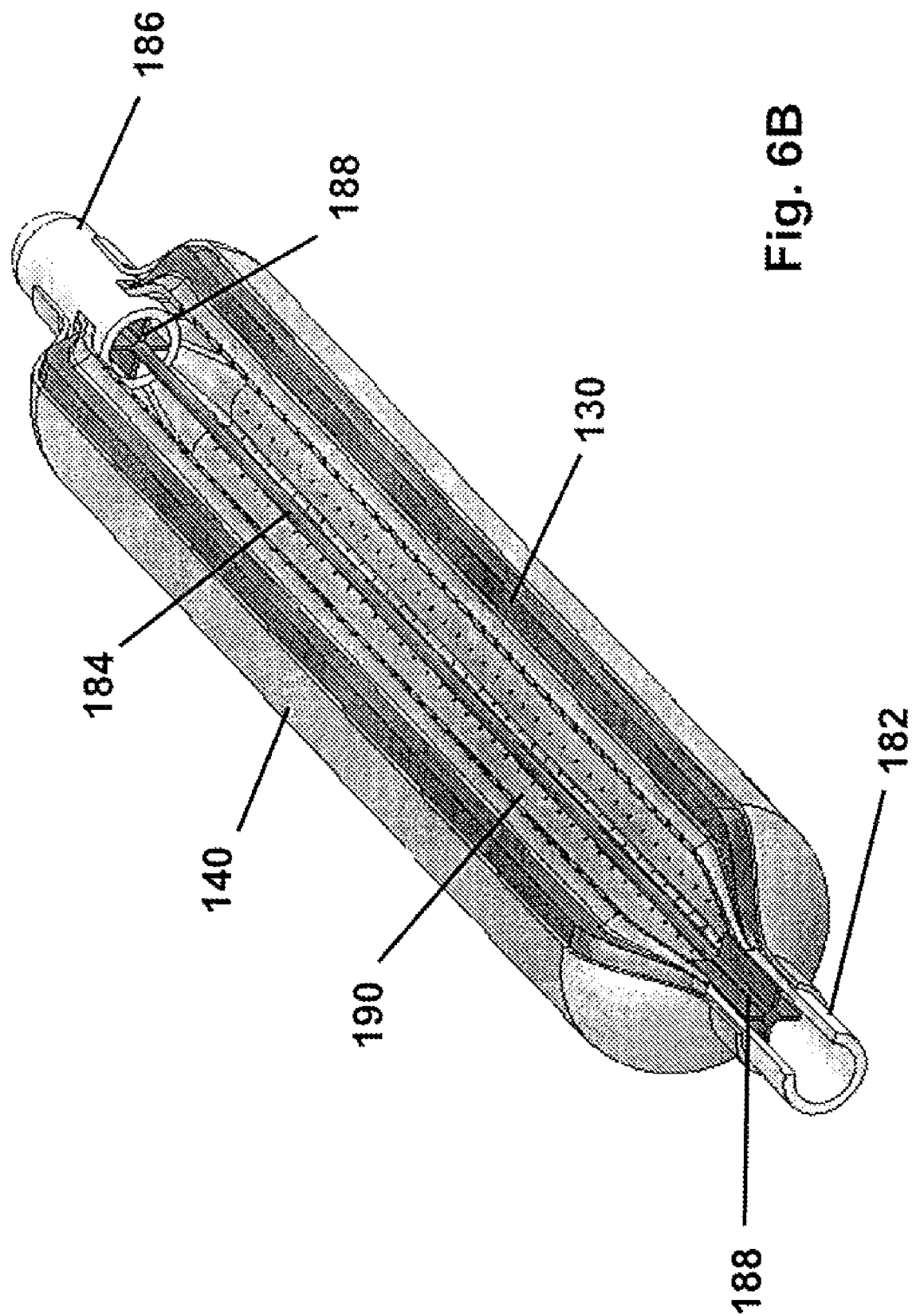

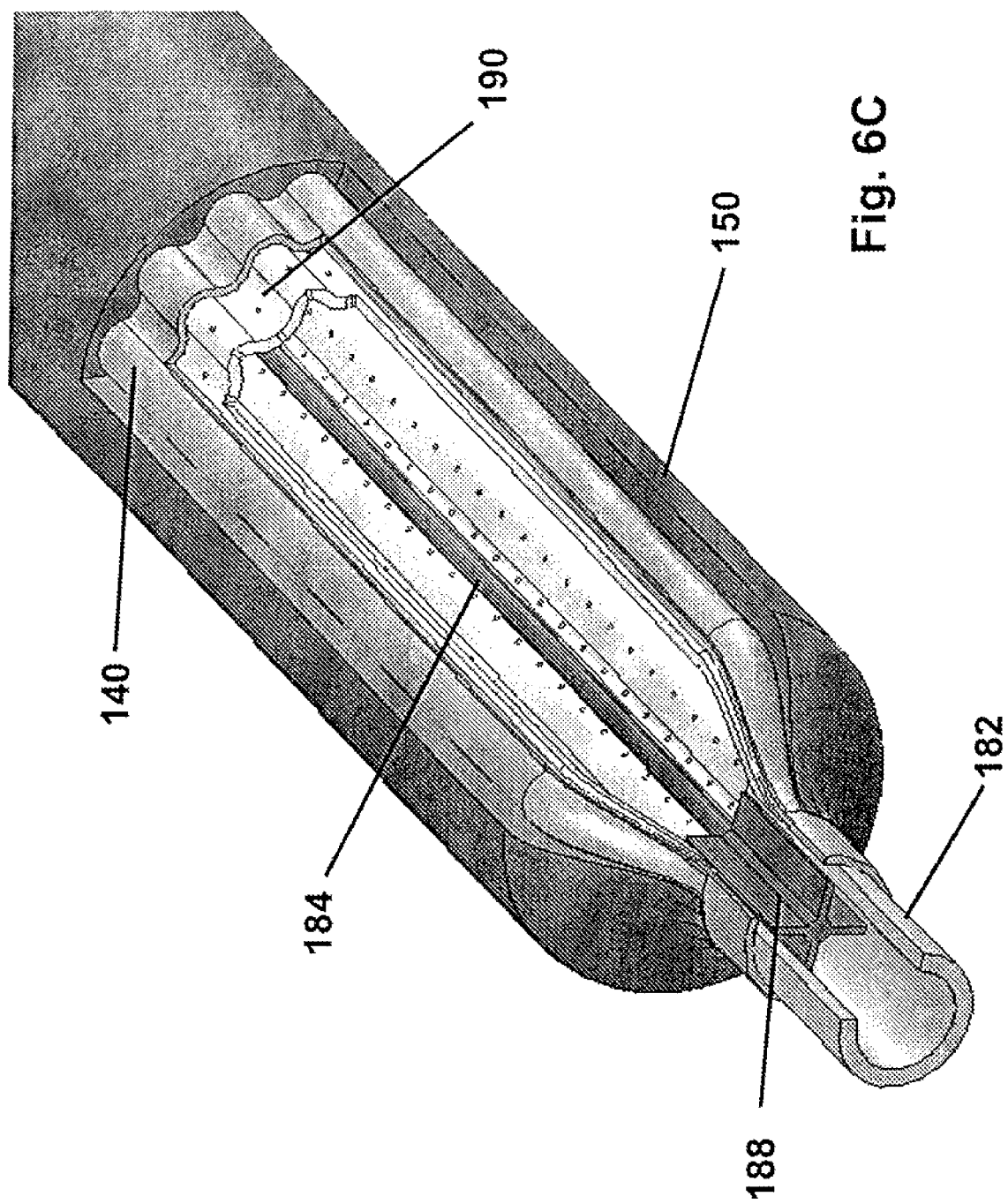

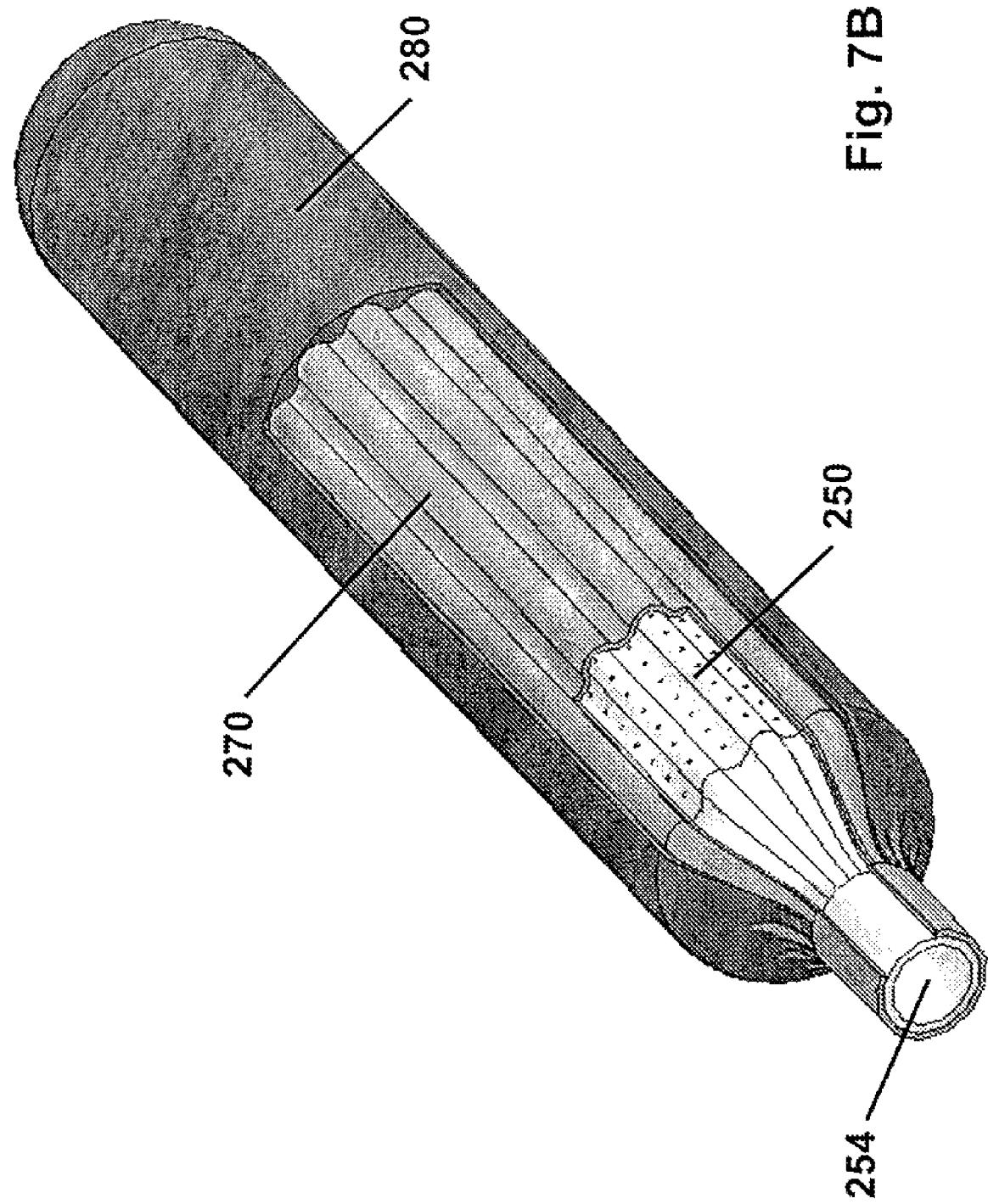

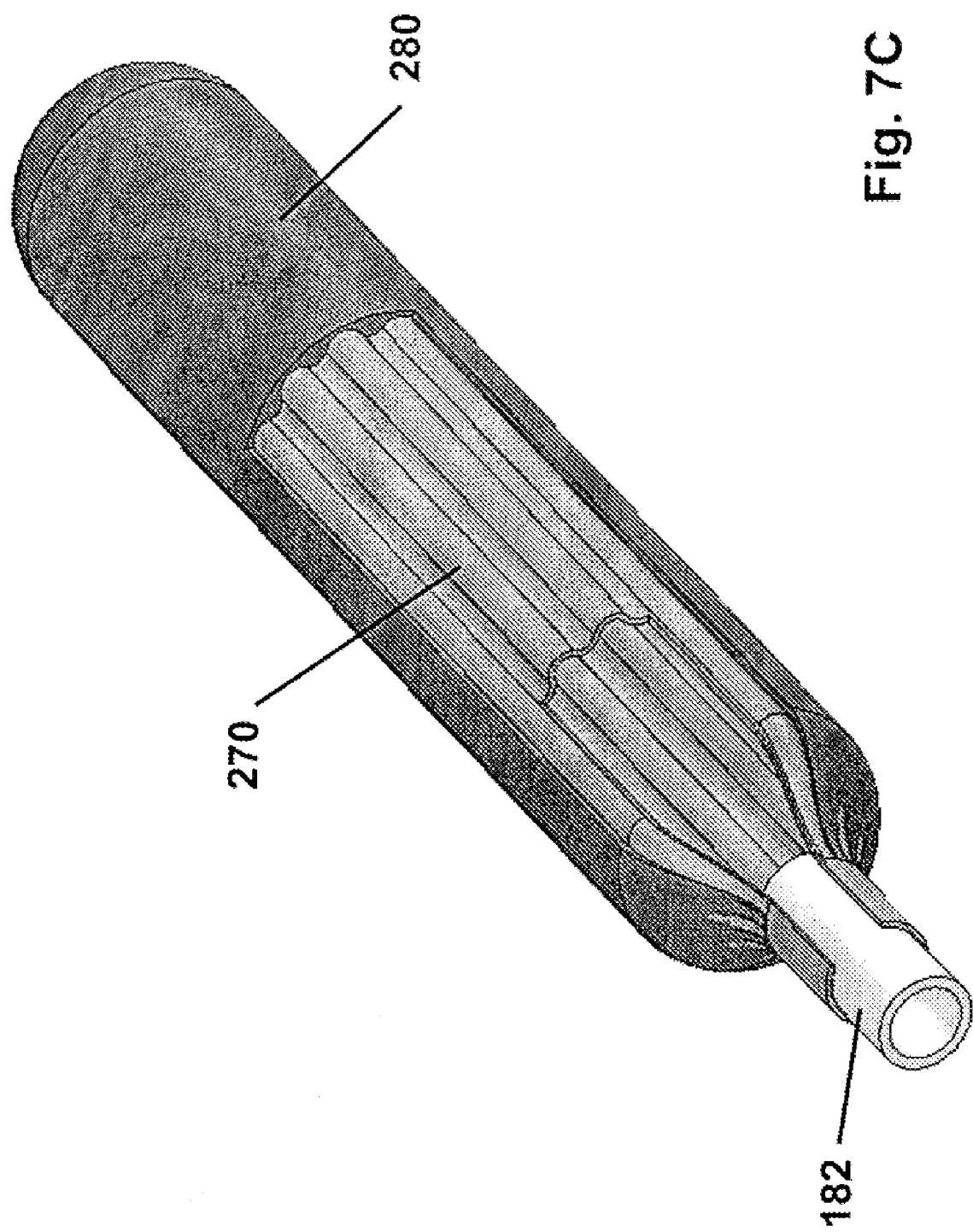

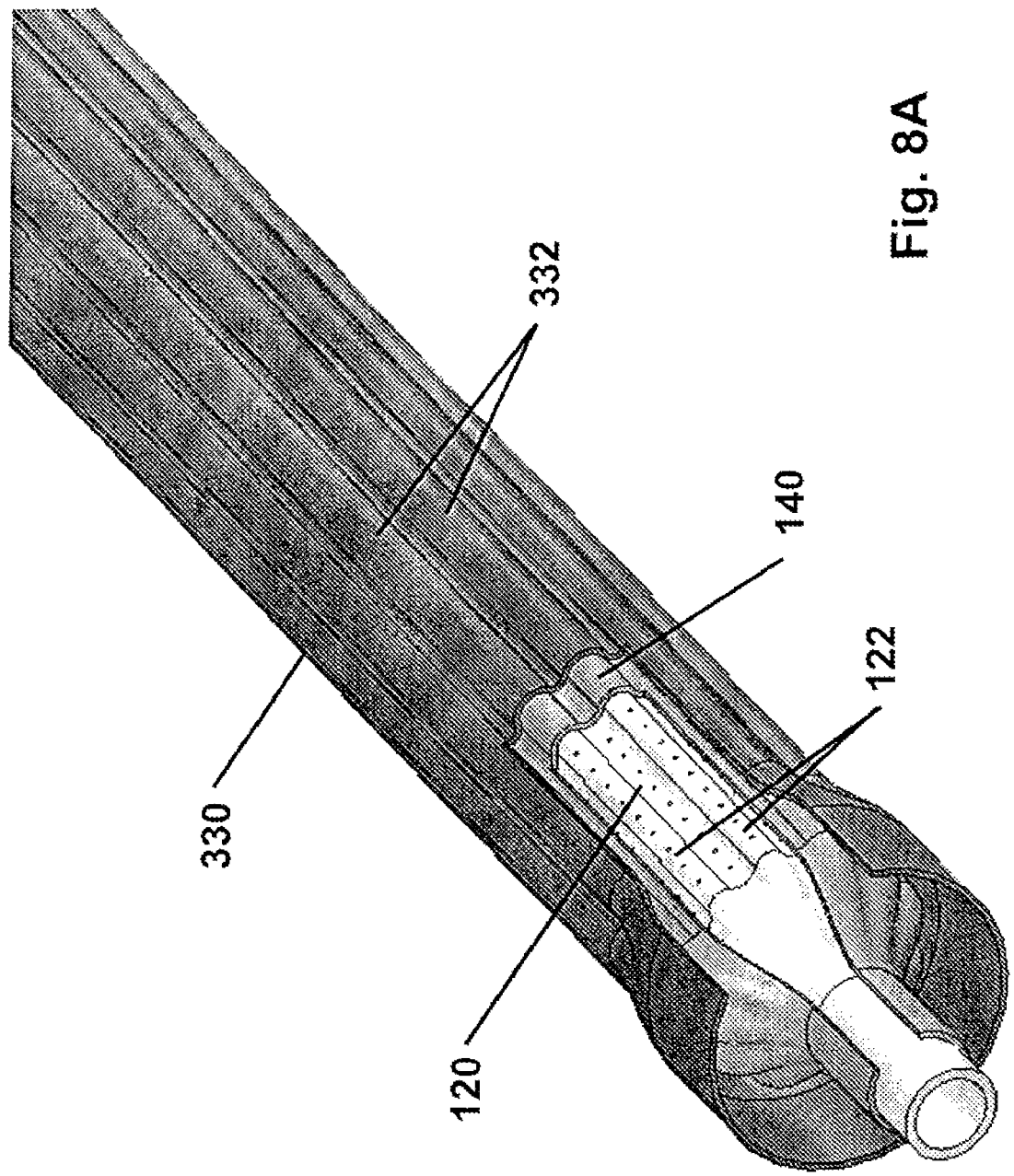

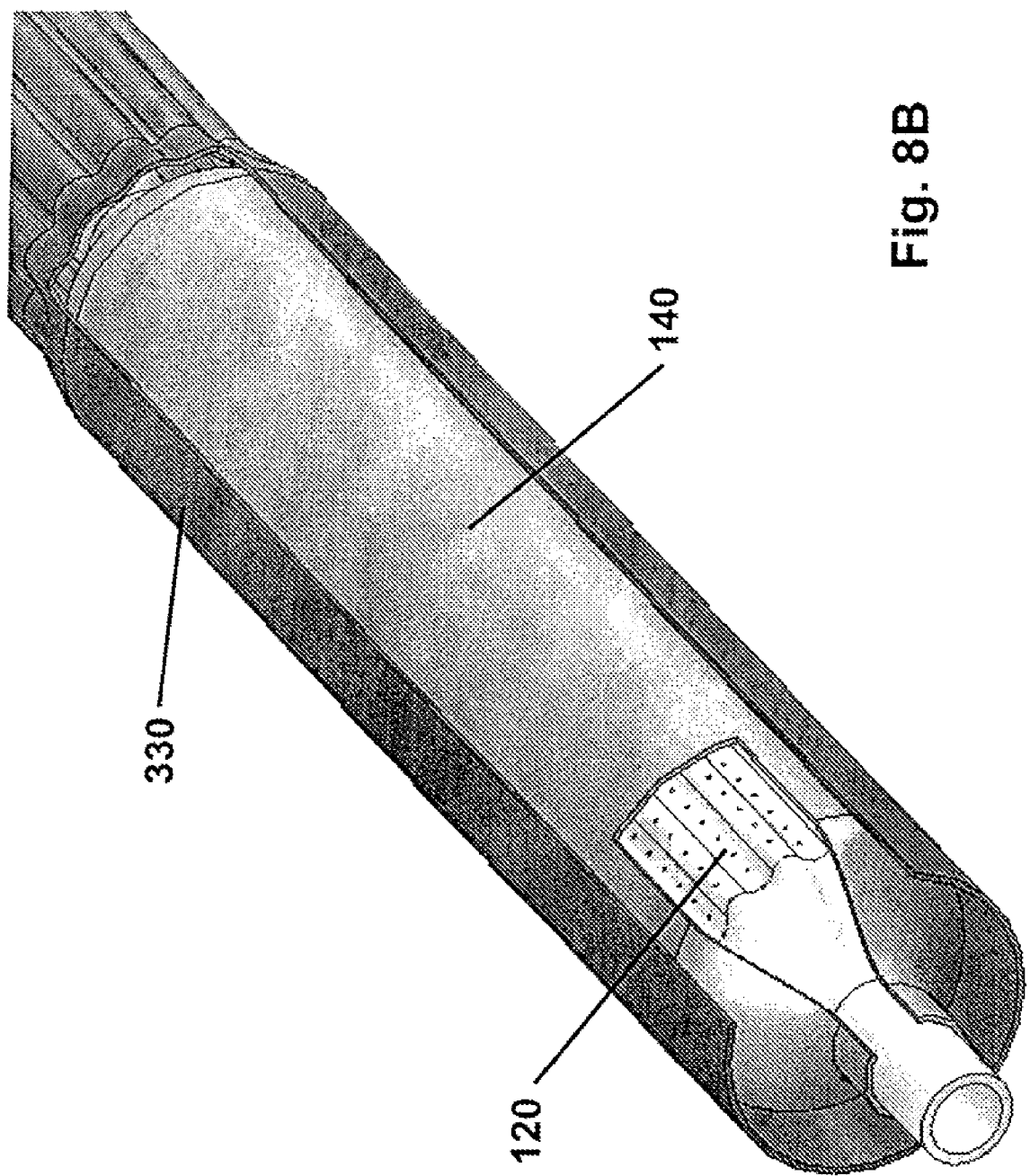

TUBULAR EXPANSION DEVICE AND METHOD OF FABRICATION

CROSS-REFERENCE TO RELATED APPLICATIONS

This application claims the benefit of U.S. Provisional Application No. 60/874,378, filed Dec. 12, 2006 and entitled "Tubular Expansion Device and Method of Fabrication," which is incorporated by reference herein.

TECHNICAL FIELD

The present invention relates to an improved tubular expansion apparatus for the controlled expansion of a tube segments and a method of fabrication thereof. The invention has application in a variety of disciplines such as the expansion of tubular casings ("tubulars") in a well bore, the expansion of tubes in a heat exchanger, or the expansion of repair sleeves in either a heat exchanger or a pipeline, as well as other applications. Current methods of accomplishing these tasks are often ineffective in controlling the expansion of the tubular, risk collapsing the tubular due to axial loads applied to the tubular, or are significantly more expensive or time consuming.

BACKGROUND

The expansion of tube segments or "tubulars" is important in a number of fields, especially in such areas as the oil field industry, heat exchanger industry and pipeline industry. The oil field industry uses expandable casing to complete wells and expandable liners are used to patch holes in existing strings of casing. The pipeline industry also uses expandable liners to patch leaks in existing pipelines or to tie together sections of pipeline under construction. In tubular heat exchangers expansion of a tubular section can be used to seat a tube within a tubesheet or to repair a leak in an existing tube within the heat exchanger. In each of the above-noted industries, a variety of methods have been employed to provide the insitu expansion of tubular sections. These methods can be grouped into three basic categories, explosive expansion, mechanical expansion, and hydraulic expansion.

Explosive expansion is primarily used in the oil well industry for the completion or repair of existing casing strings. The tubular section to be expanded is lowered into the well on a wire line or tubing string. The tubular is sealed at both ends and contains an explosive charge inside the tubular running the length of the tubular. The charge is detonated and the pressure generated expands the tubular out against the existing casing. The outside is generally sealed to the existing casing with a layer of fiberglass impregnated resin. A mandrel may then be pulled through the expanded liner to complete the expansion process.

Mechanical expansion of tubulars is also used in well completion, pipeline repair and heat exchanger fabrication and repair. Two primary methods of mechanical expansion are utilized in these various industries; linear swaging and rotary swaging. In the linear swaging method, the tubular is either affixed to the existing casing or is suspended on the wire line or tubing string. A mandrel is then forced through the tubing to expand it. Rotary swaging typically utilizes a cone with external rollers to expand the tubular. The cone is rotated while it is pulled through the tubing decreasing the axial stresses on the tubular as compared to linear swaging but increasing the torsional stresses on it.

The final method for the insitu expansion of tubulars is hydraulic expansion in which fluid pressure is used to provide the expansion force on the inside of the tubular. Two processes are used to accomplish such expansions. In direct hydraulic expansion, the tubular is sealed at its ends and fluid pressure is applied directly to the inside surface of the tubular section being expanded. In contained hydraulic expansion, the fluid is injected into a resilient member such as a rubber sleeve or bladder and the expansion of the resilient member causes the tubular to be expanded.

Each of the above methods has shortcomings which are addressed by the current invention. Explosive expansion is both expensive and complicated and the expansion of the tubular is difficult to control. Variations in the ignition of the explosive charge and in the material properties of the tubular section itself can vary the expansion of the tubular in a non-uniform manner and can even lead to rupture of the tubular section. In addition each length of tubing must be individually prepared, sealed off to contain the explosive pressure and lowered into place. An incomplete or uneven explosion can lead to a costly repair operation.

Current mechanical expansion methods also have shortcomings. With either method, the apparatus subjects the tubular to significant axial or torsional stresses which can lead to buckling of the tubular and thus damaging both the tubular section and the expansion apparatus. Once again costly retrieval operations and repairs can result. Both methods of mechanical expansion can also cause scarring of the internal surface of the tubular during the swaging process making sealing between subsequent lengths of tubing difficult. Because the length of tubular that can be expanded in one downhole operation is limited by the buckling loads imposed on the tubular, the process is both slow and expensive.

There are also weaknesses in the current methods of hydraulic expansion of tubulars. With direct hydraulic expansion, a tubular section must be sealed at its two ends and this seal must be maintained throughout the expansion process. Sealing methods in use today are complicated and expensive. In addition, since the seal must engage the ends of the tubular section, it is difficult to expand the entire length of the section with this process without damaging the seal. A secondary operation must be performed to expand the ends of the tubular. The ultimate radial expansion of the tubular is also not controlled by this method. If a repair is being made to an existing tube, some portions of the existing tube will restrain the expansion more than other portions resulting in uneven expansion and possible failures in over-expanded areas. Similar problems exist with contained hydraulic expansion since the ultimate expansion of the resilient containment is not properly controlled. These methods are also limited in their ability to expand the tubular at its end since their radial expansion is limited only by the restriction of the expanding tubular section or by the amount of fluid introduced into the resilient sleeve or bladder of the indirect hydraulic expansion process.

It is an object of the current invention to overcome the shortcomings of the current methods and apparatus described above by providing a device for the expansion of tubular sections that enables limited and controlled uniform expansion.

A further object of the current invention is to provide a device for the expansion of tubular sections that is easy to use and may be used to expand long sections of tubes or pipes including end sections in a uniform manner that avoids tubular breakage.

A further object of the current invention is to provide a device for the expansion of tubular sections in an even cylindrical manner that avoids torsional or axial stresses.

A further object of the current invention is to provide a method of manufacturing a device for the expansion of tubular sections for continuous expansion of tubulars in a uniform manner to a desired diameter.

Yet a further object of the current invention is to provide a method of expanding tubular pipes in a continuous and uniform manner with reduced scoring or weakening of the tubes.

Yet a further object of the invention is to provide a method and apparatus for the expansion of tubular end sections that is uniform in strength and diameter to sections removed from the tube end.

Yet a further object of the invention is to provide a method and apparatus for carrying the casing string into the wellbore and expanding the upper end of the casing string to lock it into place without the need of special tools to hang the casing in the well prior to expansion.

Finally a further object of the invention is to provide a method and apparatus for the repair and expansion of tubulars that lower the likelihood of difficult repair and retrieval of remote tube sections.

SUMMARY OF THE INVENTION

The foregoing are among the objects achieved by the invention, aspects of which are discussed in the text that follows in this Summary of the Invention. That text, which describes elements, steps and/or other features of some aspects of the invention, is merely provided by way of example and is not intended nor shall it be construed as limiting the invention. Particularly, it will be appreciated that other aspects of the invention comprise individual ones of the elements, steps and/or features described below (as well as elsewhere herein), as well as various combinations and subcombinations thereof.

An apparatus constructed in accordance with the current invention alleviates these problems by the advantages found in its basic design. The ultimate expansion of the tubular is controlled because the expansion of the expanding bladder is controlled. The device incorporates a specially designed bladder that is designed such that it can contain pressure in excess of that needed to expand the tubular, and thus can even force the tubular to a more cylindrical shape than could be obtained with an explosive expansion, an uncontrolled hydraulic expansion or conventional indirect hydraulic expansion. The apparatus is also designed such that the expansion forces are almost entirely radial, such that unlike mechanical expansion methods, minimal axial or torsional forces are applied to the tubular being expanded. This means that long lengths of tubing can be inserted into a well or pipeline and subsequently expanded. The current invention allows the expansion of the end of the tubular without regard to the precise location of the apparatus with respect to the end of the tubing. As long as the cylindrical portion of apparatus designed in accordance with the current invention extends beyond the end of the tubular, it will be properly expanded. Each subsequent section of the tubular can then be expanded to the same repeatable final diameter.

The present invention provides for an apparatus and for methods for expanding tubulars to a controlled diameter and for methods of fabrication of the apparatus. The expandable bladder of this invention is formed about a structural element that maintains its shape in the linear direction and allows for the introduction of pressurized fluid. In one preferred embodiment of the present invention, a bladder is formed over a removable shell which has been molded over a convoluted porous mandrel. The novel bladder of this invention is formed incorporating reinforcing wound or woven fibers that are encapsulated in resilient fluid resistant bladder material.

After the bladder is formed, the removable shell is removed through the mandrel by one of several available methods, such as dissolution in a solvent, melting, etching with an acid or base, etc. The bladder is then placed against the mandrel via an internal vacuum or an external pressure on the bladder. The bladder is then overmolded with a resilient covering to form a primarily cylindrical outer shape while holding the bladder in a shrunken convoluted form. This apparatus is then inserted into the tubular section to be expanded. This invention can be used after the tubular is already in place in a borehole, pipeline or heat exchanger. Pressure is applied through the porous mandrel to expand the bladder against the inner wall of the tubular. As the pressure increases in a uniform radial manner, the wall of the tubular yields and it expands under the applied pressure. As the bladder expands, the convolutions of the bladder begin to straighten out. The resilient overmolded cover prevents the convolutions from folding over on themselves and damaging the reinforcing fibers in the bladder. As additional pressure is applied, the circumference of the bladder increases until it equals the arc length of the convoluted bladder. The yield strength of the bladder due to its construction is sufficient to support the pressure necessary to expand the tubular along with some additional overpressure which can be defined as additional pressure after the bladder has reached its full expansion. As additional pressure is applied to the bladder, the walls of the bladder contain the overpressure within the bladder. Consequently the bladder assumes a primarily cylindrical shape forcing the tubular to likewise assume a cylindrical shape despite variations in the material properties, or wall thickness of the tubular or external loads restraining the tubular. The pressure is then reduced and the bladder collapses to allow the apparatus to be withdrawn or moved to another section of the tubular to be expanded.

An advantage of an apparatus made in accordance with this invention is that axial and torsional loads on the tubular sections expanded are greatly reduced or entirely eliminated. Axial loads generated by the internal pressure to the bladder are supported by either the internal mandrel or by the bladder itself so that minimal axial loads are applied to the tubular. This eliminates the possibility of collapsing or buckling the tubular. An additional advantage of the invention is that the apparatus resumes its original shape after each use due to the resiliency of the overmolded covering or, alternatively, a vacuum can be applied to the inlet of the mandrel drawing the bladder back into contact with the mandrel. The apparatus can thus generally expand a tubular to a diameter larger than that through which the tubular was inserted depending on the resistance of the surrounding material if in a well. The bladder is pressurized by either fluid pressure or gas pressure and the maximum extension of the bladder is controlled by its construction. Another advantage of the present invention is that while the apparatus can be made any reasonable length, the apparatus can expand tubulars that are either longer than the apparatus or shorter than the apparatus without a significant difference in the expanded diameter along the length of the tubular.

Other aspects, features and advantages of the present invention will become apparent from the following detailed description of the various embodiments of the invention along with the accompanying drawings which illustrate the principles of the invention.

DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

It should be noted that the attached drawings illustrate only typical embodiments of this invention and are therefore not to be considered limiting of its scope. The invention may admit other equally effective embodiments. It should also be noted that most of the drawings show an apparatus that is relatively short axially. The length of the apparatus is only limited by handling, insertion, and fabrication restrictions. The shorter embodiments are shown for convenience and to show the internal configuration of the apparatus.

FIG. 1A is a partially sectioned isometric view of an apparatus made in accordance with the invention seated in a tubular section in its un-pressurized condition.

FIG. 1B is a partially sectioned isometric view of an apparatus made in accordance with the invention seated in a tubular section in its pressurized condition for expansion of a tubular section.

FIG. 3A is an isometric view of the center mandrel of the expansion device of the subject invention.

FIG. 3B is a partially sectioned isometric view of the mandrel of FIG. 3A covered by a removable shell.

FIGS. 4A-C are a series of sectioned isometric views depicting the fabrication of another preferred embodiment of the invention having a multilayer inflatable bladder.

FIGS. 5A-F are a series of sectioned isometric views depicting the fabrication of another preferred embodiment of the invention wherein the expansion device is fabricated about a removable porous tube.

FIGS. 6A-D are a series of sectioned isometric views depicting the fabrication of a preferred embodiment of the invention which consists of an inlet tube and end tube connected by a flexible member, a convoluted reinforced resilient bladder, and an overmolded resilient covering.

FIGS. 7A-C are a series of sectioned isometric views depicting the fabrication of a preferred embodiment of the invention which consists of a convoluted reinforced resilient bladder with axial reinforcement and an overmolded resilient covering.

FIGS. 8A-B are two sectioned isometric views depicting the fabrication of a preferred embodiment of the invention which consists of a convoluted mandrel and a resilient bladder wherein the convolutions in the mandrel and the bladder are matched to convolutions in the tubular to be expanded.

DETAILED DESCRIPTION OF THE INVENTION

Figure 2:
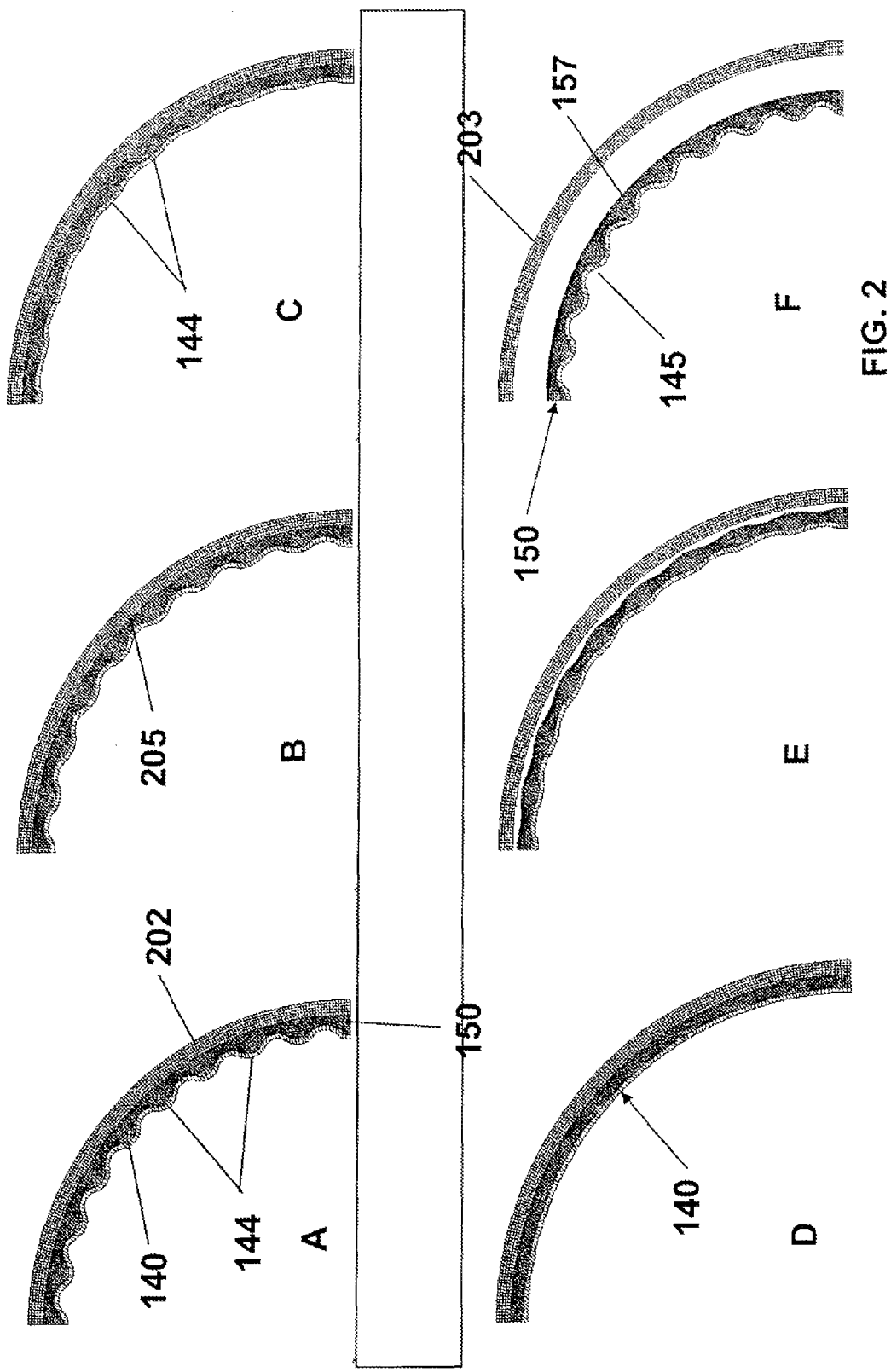
FIGS. 2A-F are a series of quarter section views of the inflatable bladder and overmolded resilient covering shown inside a tubular during the expansion cycle.

The present invention relates devices and methods for controlled expansion of tubular sections. An expandable bladder of this invention is formed about a structural element that maintains its shape in the linear direction and allows for the introduction of a pressurized fluid. In one preferred embodiment of the present invention, a novel bladder is formed over a removable shell which has been molded over a convoluted porous mandrel which in this embodiment forms the structural element. The bladder of this invention is formed incorporating reinforcing wound or woven fibers that are encapsulated in resilient fluid resistant bladder material. The bladder is capable of withstanding internal hydraulic pressures sufficient to controllably force expansion of a surrounding metallic tube without rupture and damage.

FIGS. 1A-B provide isometric views of the present invention according to one preferred embodiment. The apparatus 100 is shown in FIG. 1A in an unexpanded condition inserted into tubular 200. The tubular 200 could be part of a casing string oriented vertically or a liner being inserted horizontally as a patch in a pipeline or alternatively a tube being inserted into a tube sheet in a heat exchanger. The apparatus 100 is connected to a pressure source through connection 129, and, in a typical well drilling operation, this pipe would lead to the surface. A convoluted bladder 140 surrounds the convoluted mandrel 120. The bladder 140 is overmolded with a resilient coating 150 which holds bladder 140 in convoluted form until it is pressurized. Fluid (liquid or gas) is introduced into the mandrel 120 through connection 129. This fluid is transmitted from the inside of the mandrel through perforations 124 which extend from the interior surface of the mandrel to the exterior surface of the mandrel. The fluid pressurizes the convoluted bladder 140 and radially expands the unexpanded section 202 of the tubular 200. As the bladder expands, convolutions 144 straighten and become less pronounced. Resilient covering 150 stretches and compresses to essentially fill an annulus between the expanded bladder 140 and the expanded section of the tubular 203 as shown in FIG. 1B which provides a sectioned isometric view of the expanded tubular.

Use of the Expansion Device

FIG. 2A provides a finite element mesh of a cross section view of a quarter of the apparatus 100 and the unexpanded tubular 202. FIGS. 2B-F show the expansion of the tubular and the contraction of the bladder upon depressurization. During the initial expansion, shown in FIG. 2B, the pressure applied to the inside of the bladder 140 is transferred through the resilient coating 150 to the inner surface 205 of the unexpanded tubular 202. As the tubular 202 plastically deforms, as shown in FIG. 2C, the bladder 140 expands straightening out convolutions 144 and resilient coating 150 is both stretched circumferentially and compressed radially. FIG. 2D shows the bladder 140 at its maximum circumference. When the bladder 140 first reaches this maximum, the pressure on the inner surface 145 of the bladder 140 and the pressure on the outer surface 157 of the resilient covering 150 are essentially the same (except for the pressure required to expand the resilient covering 150 which is small). Consequently the roundness of the deformed tubular 202 can be altered by any variation in the material properties of the tubular 202 and by any external loads applied to the tubular. When additional pressure is applied to the inner surface 145 of the bladder 140 (through connection 129) the additional load is carried by the bladder 140 as a circumferential tension. This tension T is given by $T=(P_{inner}-P_{outer})*R_{local}$ where $P_{inner}$ is the internal pressure on the bladder 140, $P_{outer}$ is the pressure on the outer surface of the bladder, or equivalently the pressure on the outer surface of the resilient covering, and $R_{local}$ is the local radius of curvature of the bladder 140. Initially if the tubular 202 is not round, $R_{local}$ will vary and any pressure difference must be supported by bending moments in the tubular. Since the tubular is already in fully plastic strain at this point, the additional bending moments it can support are limited. Thus, as the internal pressure is increased and the tension T in the bladder increases, both the bladder 140 and the tubular 202 are forced to an essentially cylindrical shape. As the pressure is released the bladder returns to its initial configuration as shown in FIGS. 2E and 2F. The tubular will recover any elastic strain from the expansion process and will try to return to its non-cylindrical shape but since its recovery is limited to roughly 0.5% strain, any non-uniformity of radius will be limited.

If the tubular is being expanded inside another tubular such as is the case for repairing casing or repairing a pipeline, the inner tubular will first conform to any anomalies in the outer tubing and then as additional pressure is applied, both tubulars will expand until the bladder reaches its fully expanded circumference. Any additional overpressure will tend to force both the bladder and the two tubulars into a more cylindrical shape which will be retained upon depressurization.

Fabrication of the Tubular Section Expansion Device

In one preferred embodiment of the invention the expansion device 100 is formed around a mandrel 120 having a series of convolutions 122 which are sized to conform to the size of the interior surface of the bladder 140 in the deflated condition. The arc length of the convolutions is sized to conform to the circumference of the inner surface of the bladder in the expanded condition. One end of the mandrel 128 is closed off and the other end 129 is open. As shown in FIG. 3A the mandrel 120 contains a series of holes 124 through the wall of the mandrel. These holes provide fluid communication between the inside and outside of the mandrel. This function could as well be performed by a mandrel which provides a region with porous walls rather than discrete holes in a solid wall.

FIG. 3B shows the next step in the fabrication of this particular embodiment of the invention. The mandrel 120 is coated with a removable shell 130. This shell can be formed from a low-melting point metal such as Woods metal (a lead alloy), a metal such as zinc which can be etched with an acid or a base, a hard wax, a low melting point plastic, a dissolvable plastic or any similar material which will allow the bladder to be formed over it and can then be subsequently removed from between the mandrel and the bladder by either heating the assembly to liquefy the shell material or by dissolving the shell in a solvent, or by etching the shell with an acid or a base. This removable shell 130 is formed to the dimensions of the internal surface of the bladder 140 when the bladder is fully expanded but is not subjected to any overpressure as described above. Said shell 130 can be formed to the final configuration in a mold or can be molded to a larger diameter than required and machined to the final required shape.

Figure 3C:
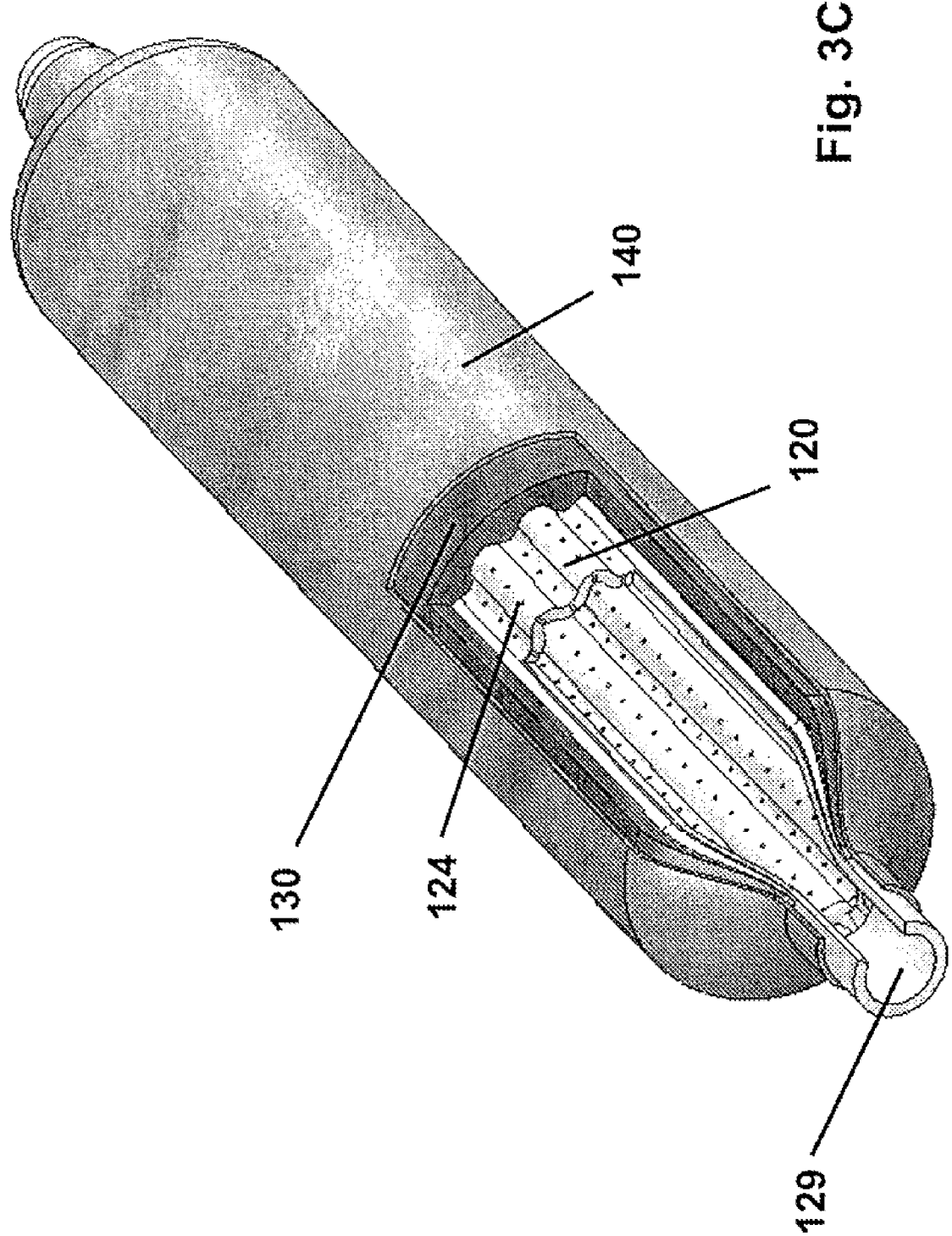
FIG. 3C is a partially sectioned isometric view of the mandrel of FIG. 3B covered by a removable shell and resilient bladder material.

The next step in fabricating said embodiment of the invention is forming the bladder 140 over the removable shell 130 as shown in FIG. 3C. The bladder is a composite structure formed from woven or wound fibers in a substantially fluid impervious resilient matrix. The fibers can be metallic such as steel, stainless steel, titanium, or any other suitable metal or can be formed from a polymer fiber such as Aramid, PEN, polyester, or similar high strength fiber or can preferably be formed from carbon fiber. The reinforcing fibers may be treated with a coating such as a silane or otherwise be treated to improve their adhesion to the resilient matrix. The resilient matrix can be formed from an elastomer such as Buna-N rubber, polyurethane, fluorosilicone, or fluorocarbon. A particularly preferred material for use in the fabrication of the bladder is a silicone rubber due to its flexibility, adhesion, and temperature range. If desired, the bladder may be a laminated structure with an inner layer of a fluid resistant polymer, for example polyamideimide or PET.

In said preferred embodiment of the invention, the majority of the fibers are oriented in alternating layers of helixes wherein the angle between the longitudinal axis of the bladder and the fiber direction is between 40° and 80° but is preferably greater than 55° such that the bladder does not expand beyond its fully inflated condition except due to the elastic stretching of the reinforcing fibers. These fibers typically have a high elastic modulus and an elastic strain in the range of 0.5% to 3%.

Following the formation of the bladder 140, the removable shell 130 is removed by one of a variety of methods depending on the material from which the removable shell was formed. For example, the removable shell could be formed from a metal alloy having a low melting temperature. When the mandrel 120, removable shell 130 and bladder 140 are heated above the melting temperature of the metal alloy, the shell 130 liquefies and can be removed through the perforations 124 of the mandrel 120 and then through connection 129. Alternatively the removable shell 130 can be formed from a dissolvable material such as polystyrene which can then be subsequently removed with a suitable solvent such as acetone through said perforations 124 in mandrel 120. Any suitable material which can be used to form the composite bladder 140 and can then subsequently be removed through the perforations 124 of the mandrel 120 without damaging either said bladder or said mandrel may be used.

Figure 3D:
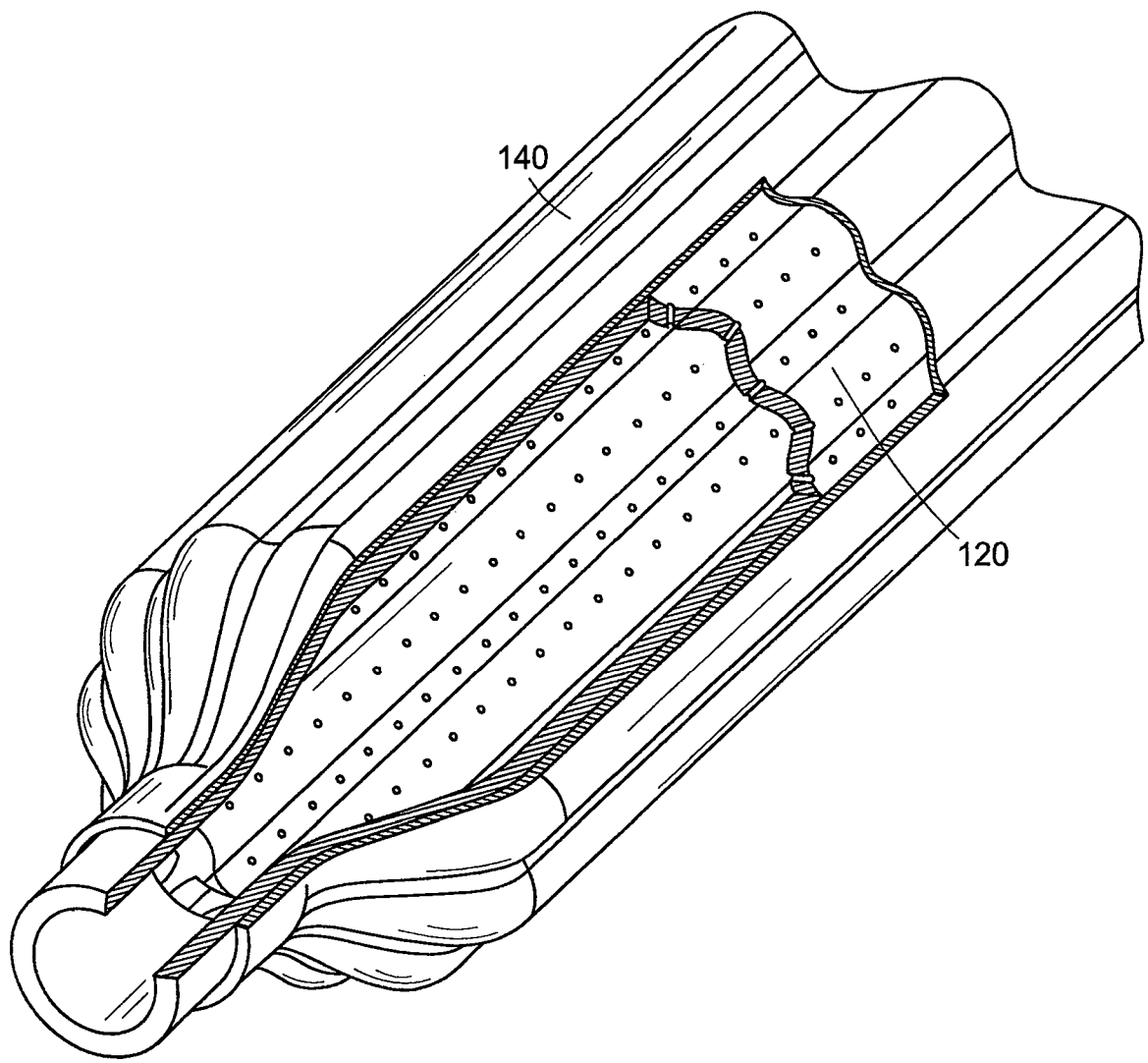
FIG. 3D is a partially sectioned isometric view of the mandrel of FIG. 3C in which the removable shell has been removed and the resilient bladder has been drawn in against the mandrel.
Figure 3E:
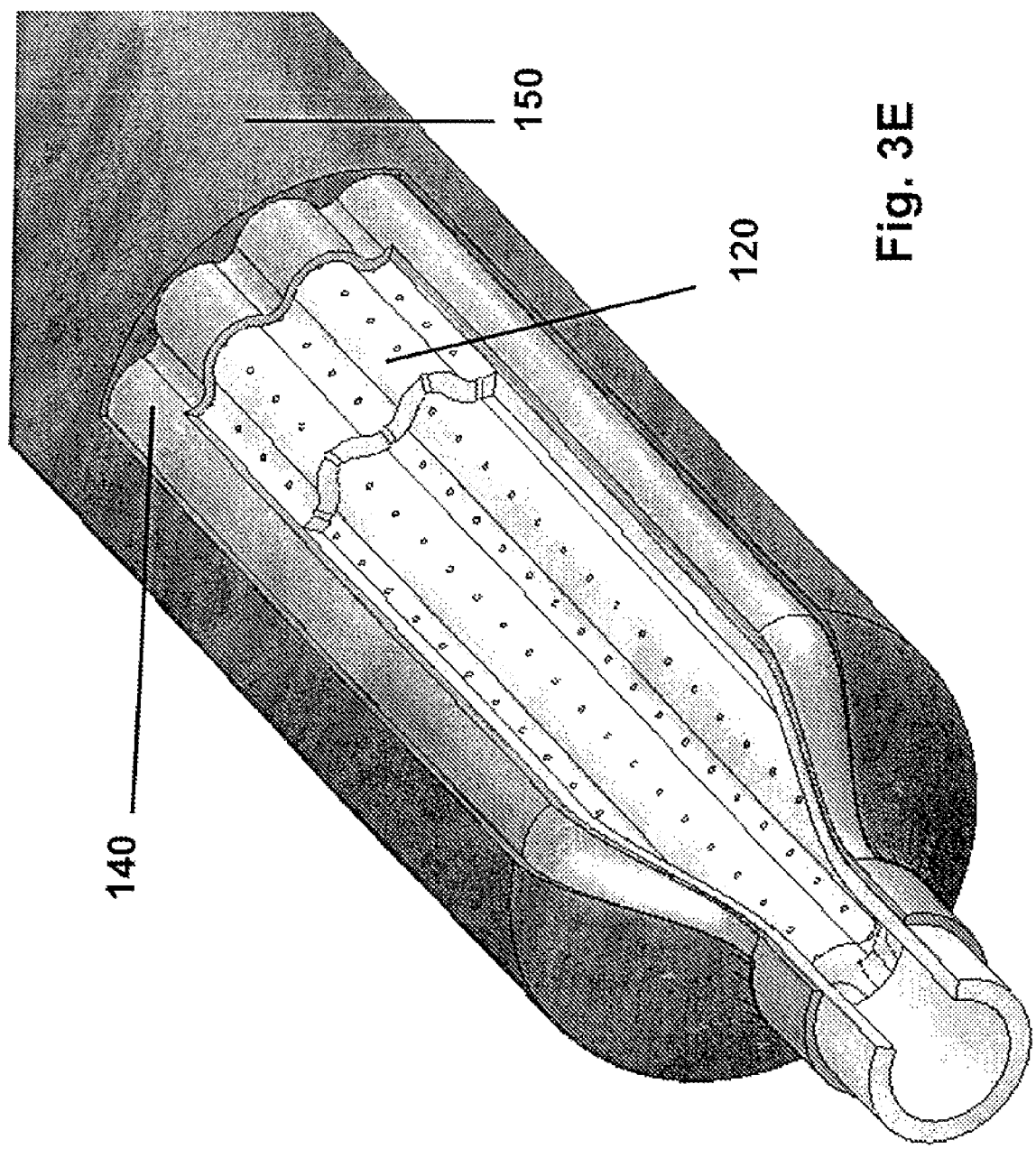
FIG. 3E is a partially sectioned isometric view of the mandrel of FIG. 3D in which the bladder has been over-molded with a resilient material.

Following the removal of said shell 130 the bladder 140 is placed in contact with mandrel 120 as is shown in FIG. 3D. This is accomplished either by internal vacuum applied through connection 129 and through perforations 124 or by applying external pressure to the bladder. A resilient covering 150 is then overmolded onto the bladder as diagrammed in FIG. 3E. The resilient covering 150 can be made of any elastomer which will tolerate the conditions to which the apparatus will be subjected during the expansion of the tubular 200. Said material may be polyurethane, silicone, fluorosilicone, fluorocarbon, or similar material. The overmolded resilient covering 150 holds the bladder 140 in its substantially convoluted form when not under internal pressure. As pressure is applied, the bladder 140 will expand compressing the overmolded resilient covering 150 radially and stretching it circumferentially. After the tubular 200 is expanded, and the pressure is released; the overmolded resilient covering 150 returns to its unstressed state causing the bladder 140 to resume its convoluted form. This process is shown in FIG. 3.

ALTERNATE EMBODIMENT

Figure 4B:
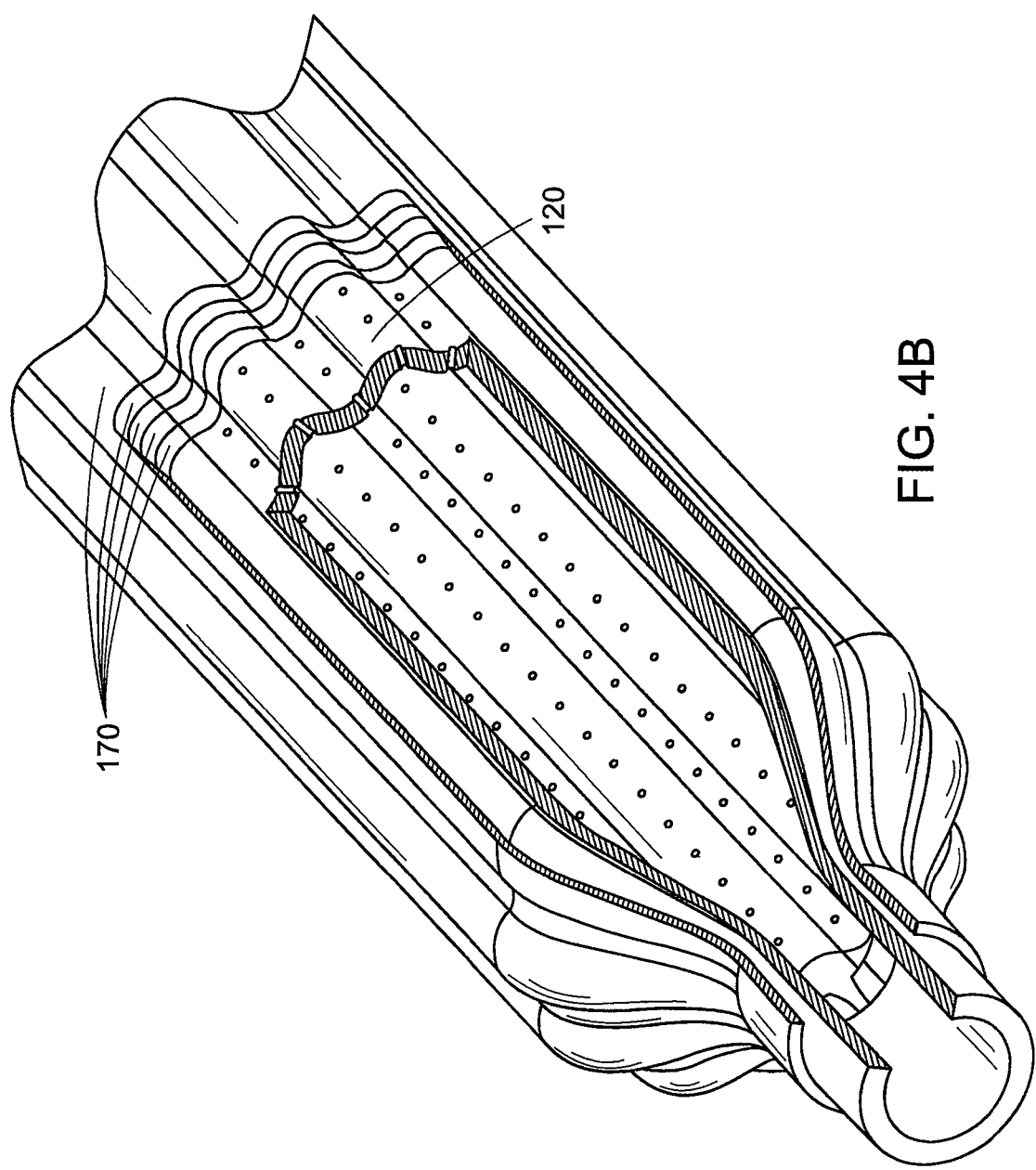
Figure 4C:
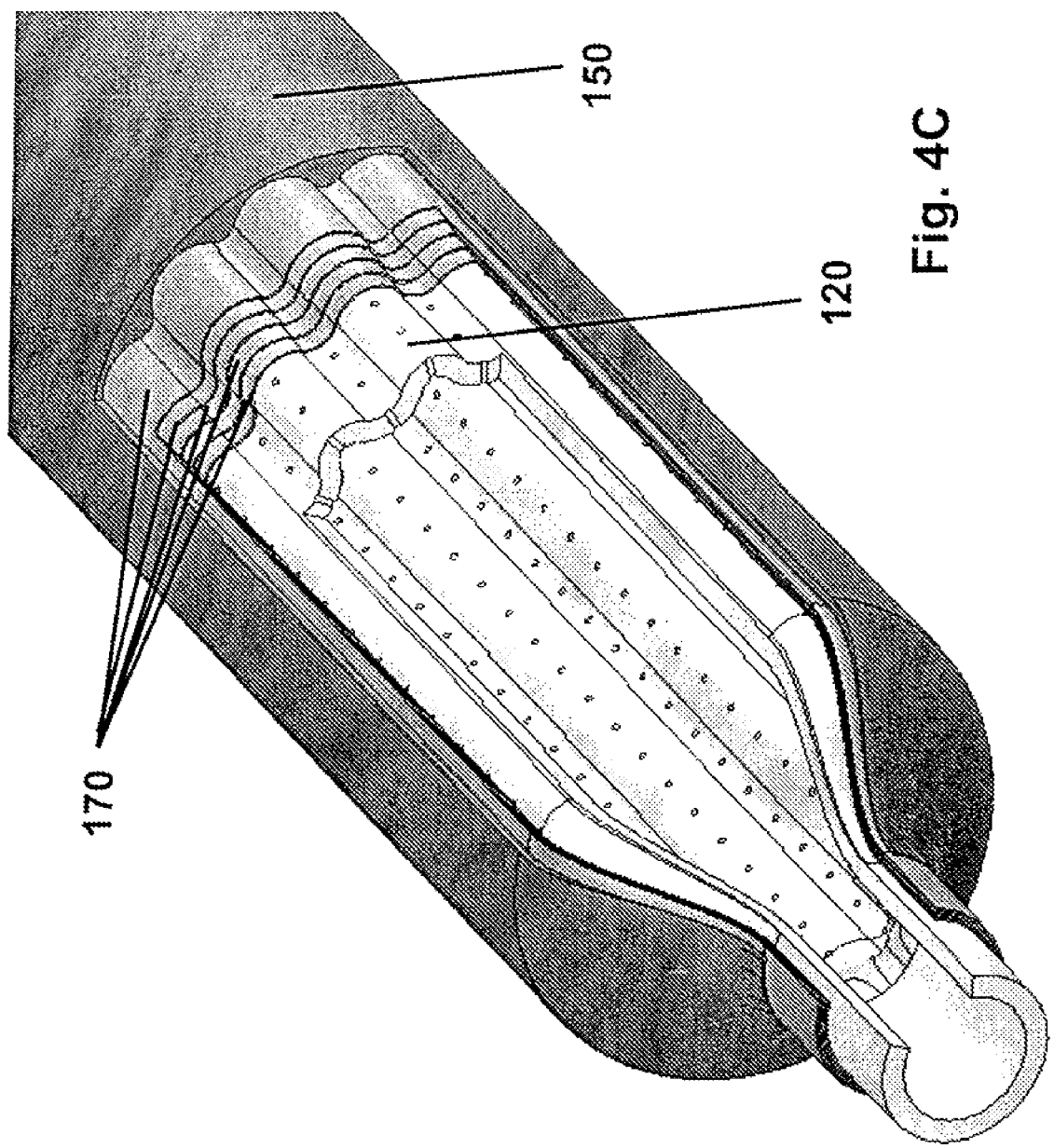

FIGS. 4A-C shows an alternative preferred embodiment of the invention. The convoluted mandrel 120 and the removable shell 130 are formed in the same manner as outlined above. In the previous embodiment, the reinforcing fibers of the bladder were completely surrounded by a resilient covering. In that embodiment the surrounding matrix must be resilient in order for the formed bladder 140 to be convoluted without overstressing the fibers. The fiber stress due to the bending is relieved by allowing the fibers to move relative to one another through the thickness of the bladder. The present preferred embodiment uses a number of layers 170 to fabricate the bladder. Each bladder layer 170 is reinforced with fibers of metal, polymer or carbon in the same manner as described earlier. In the present embodiment, however, the matrix in which the fibers are imbedded need not be resilient if the bladder layers 170 are thin enough. The convolutions 124 must be designed with respect to the thickness of the bladder layers 170 such that conforming the bladder layers to the convolutions of the mandrel would not cause the stresses in either the non-resilient matrix or the reinforcing fibers to exceed their elastic limit. Ideally the moment required to form each bladder layer into the convoluted configuration should be smaller than the restraining force of the overmolded resilient covering 150 when the bladder is not pressurized. Each bladder layer 170 would be separated from its adjacent bladder layer with a thin intermediate layer to prevent adhesion of each successive layer to its underlying layer. This intermediate layer could be a layer of polymer such as polytetrafluoroethylene, a layer of wax, a layer of mold release agent such a polyvinyl alcohol, a layer of powder such as graphite or boron nitride, or any similar agent which will allow the adjacent bladder layers to slide with respect to each other. FIGS. 4A-C show five bladder layers 170 in the bladder but any number of bladder layers could be used to achieve the required conformability along with the required strength. FIG. 4C shows the overmolded resilient covering over the outermost layer of the bladder. The layered bladder 170 will be brought into contact with the convoluted mandrel 140 by either internal vacuum or, more preferably, external pressure, and the resilient covering 150 will then be molded over the layered bladder 170. Preferably the overmolded resilient covering 150 will be bonded to the outermost layer of the bladder.

Figure 5A:
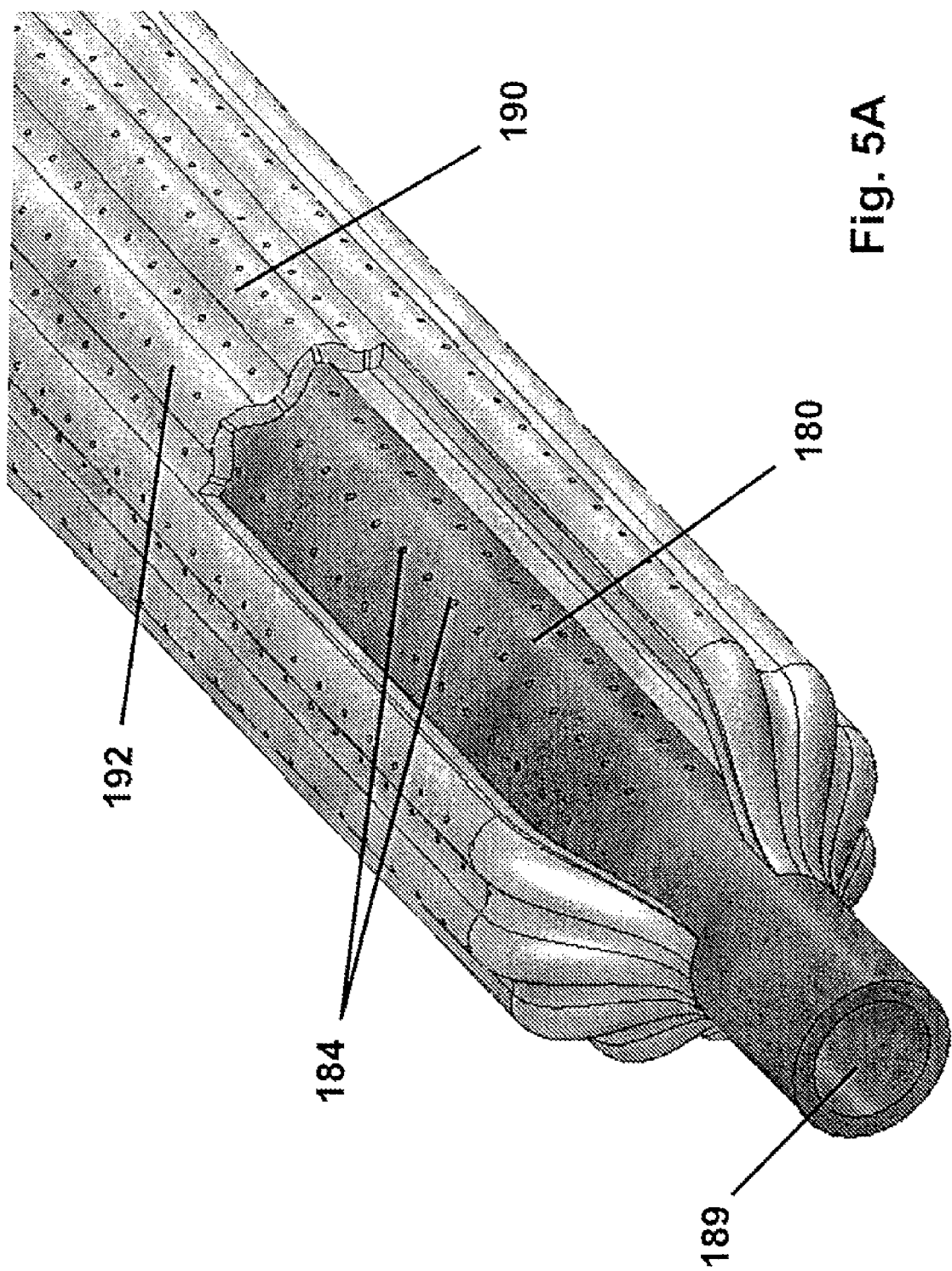
Figure 5B:
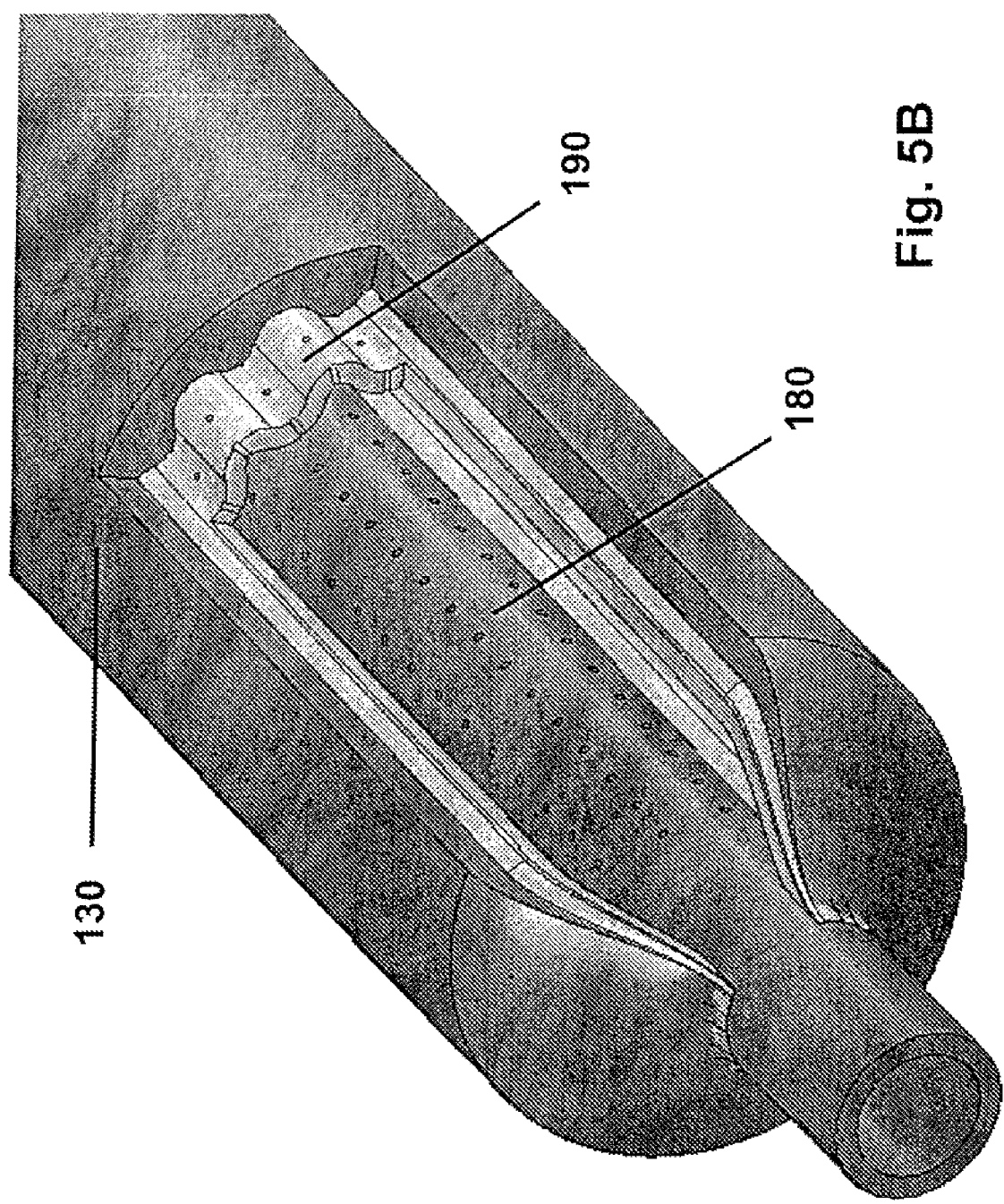
Figure 5C:
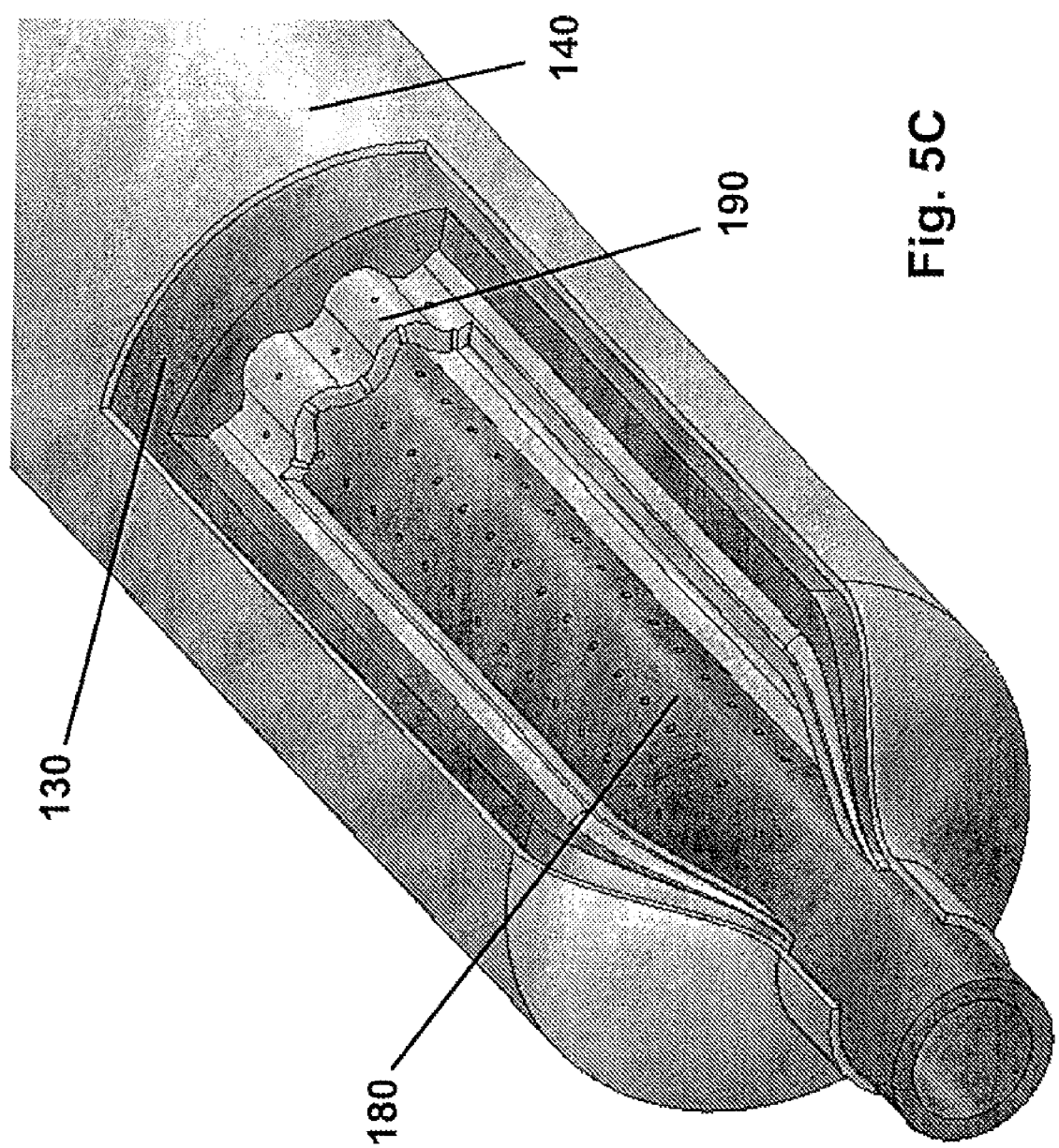
Figure 5D:
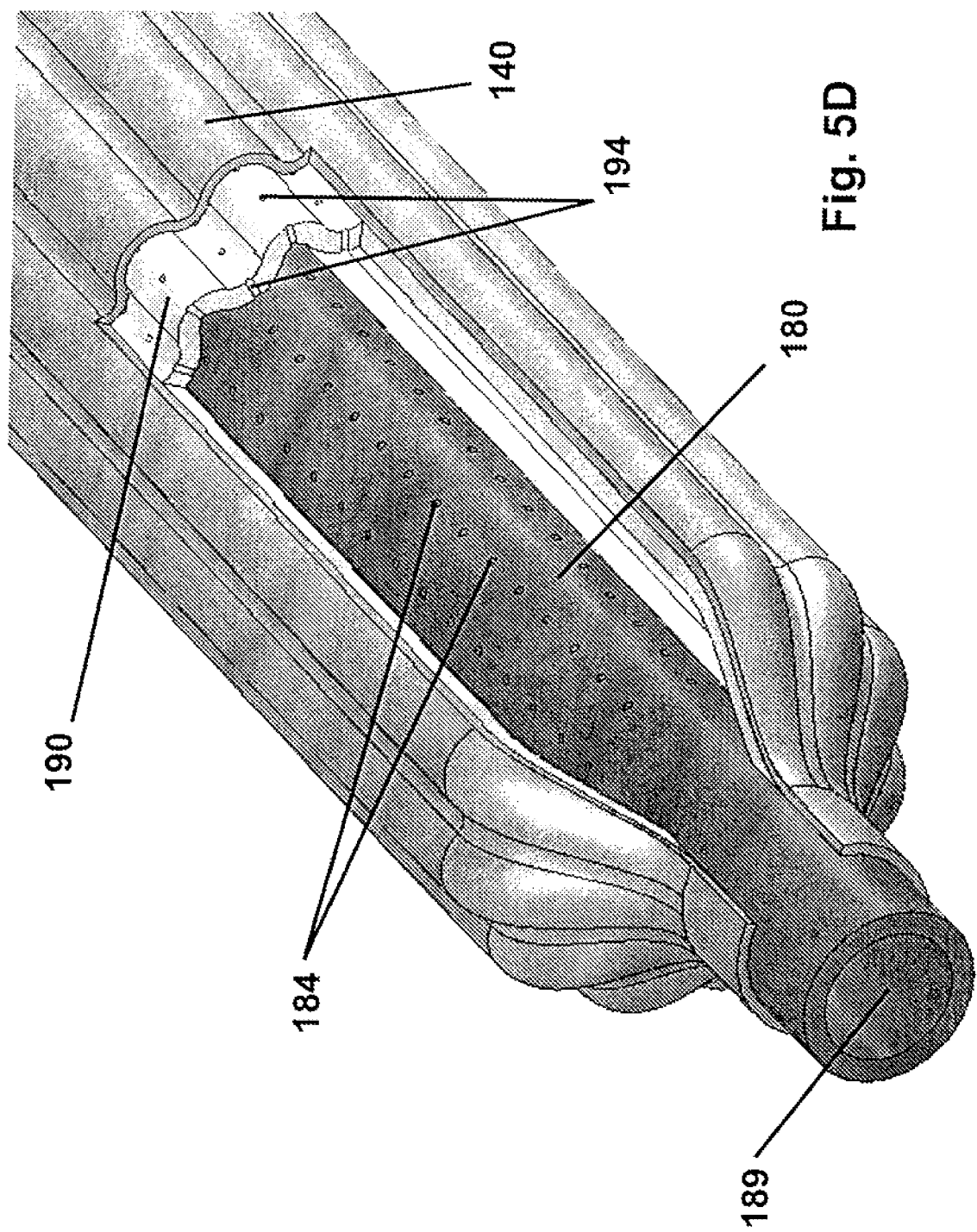
Figure 5F:
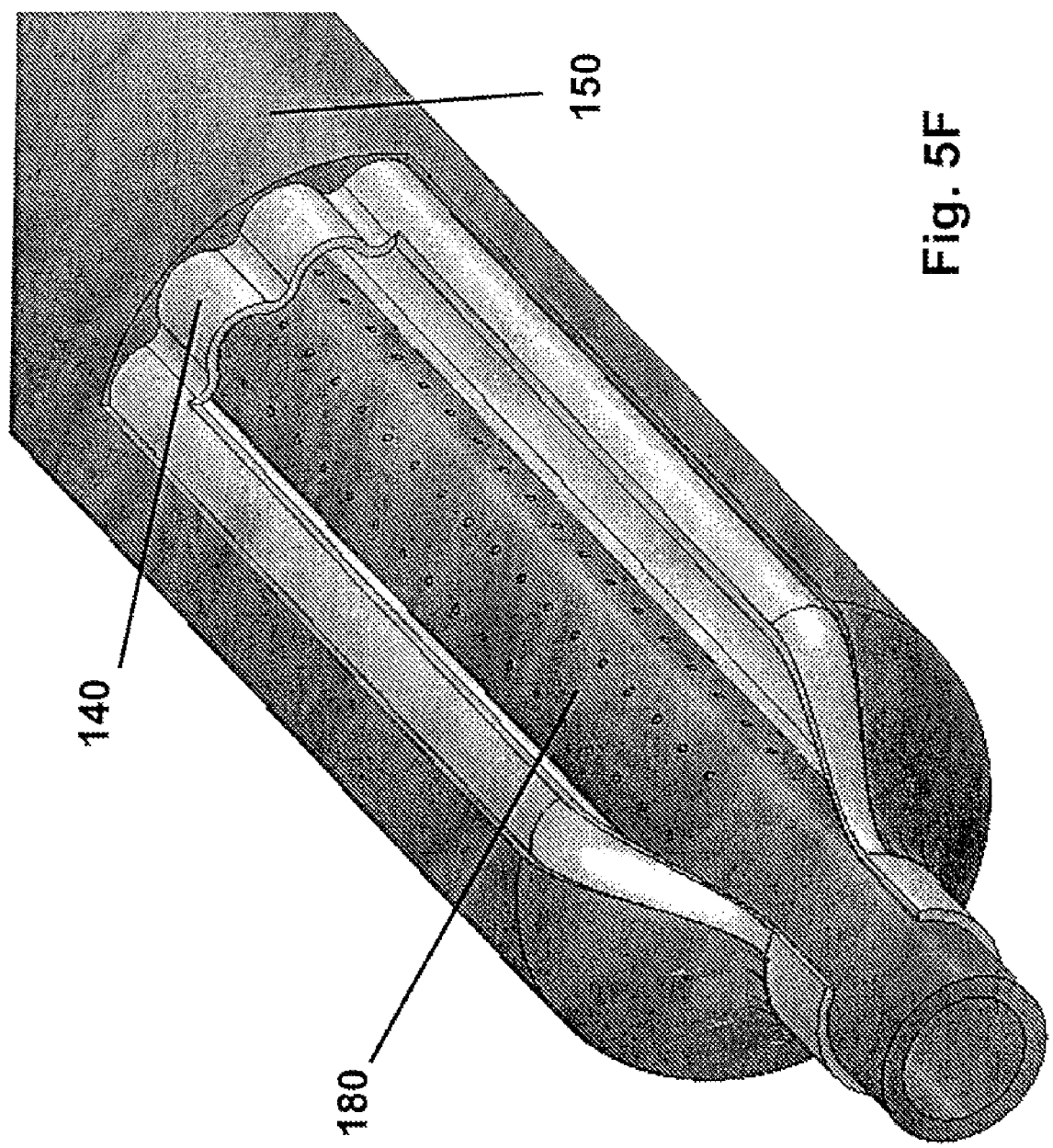
Figure 6A:
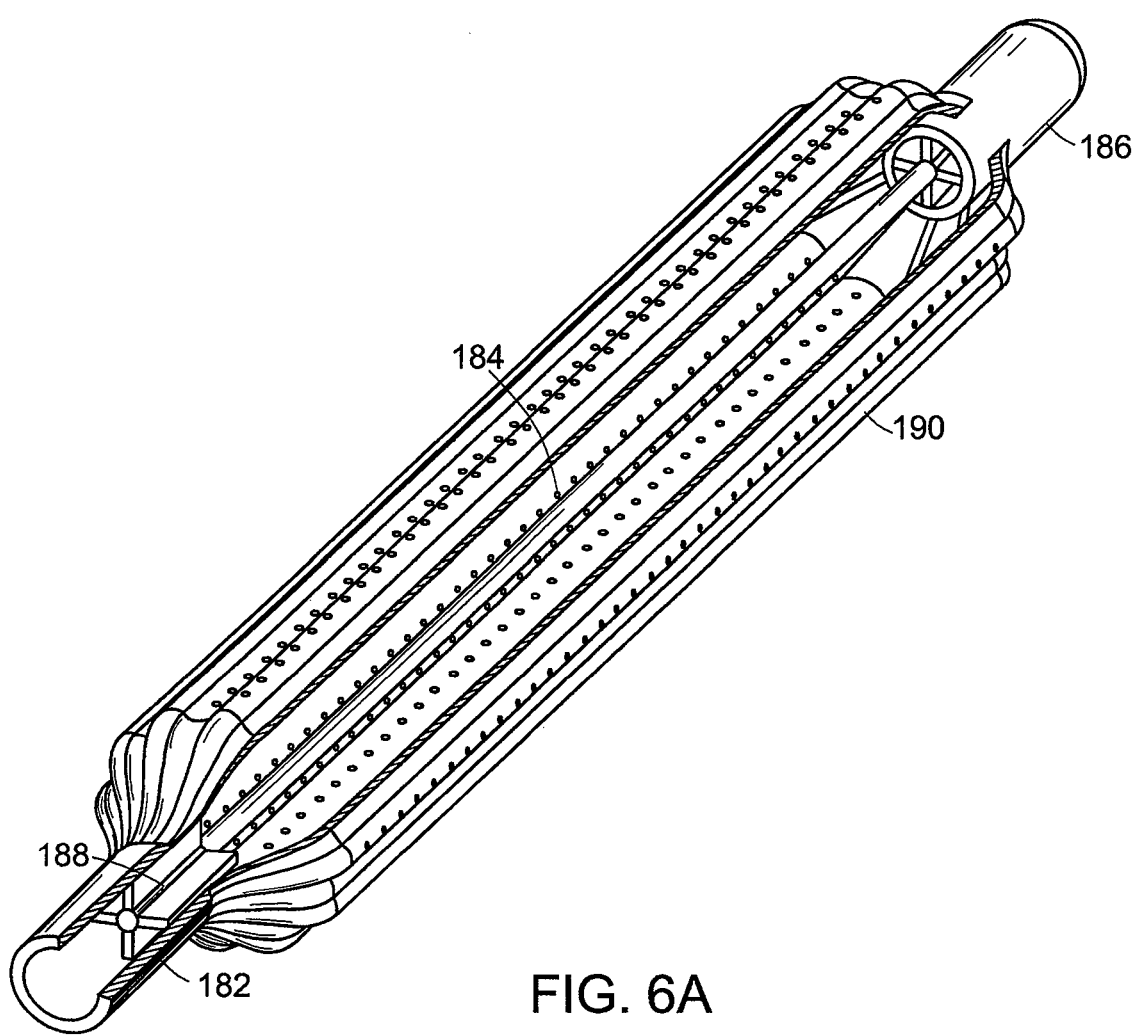
Figure 6D:
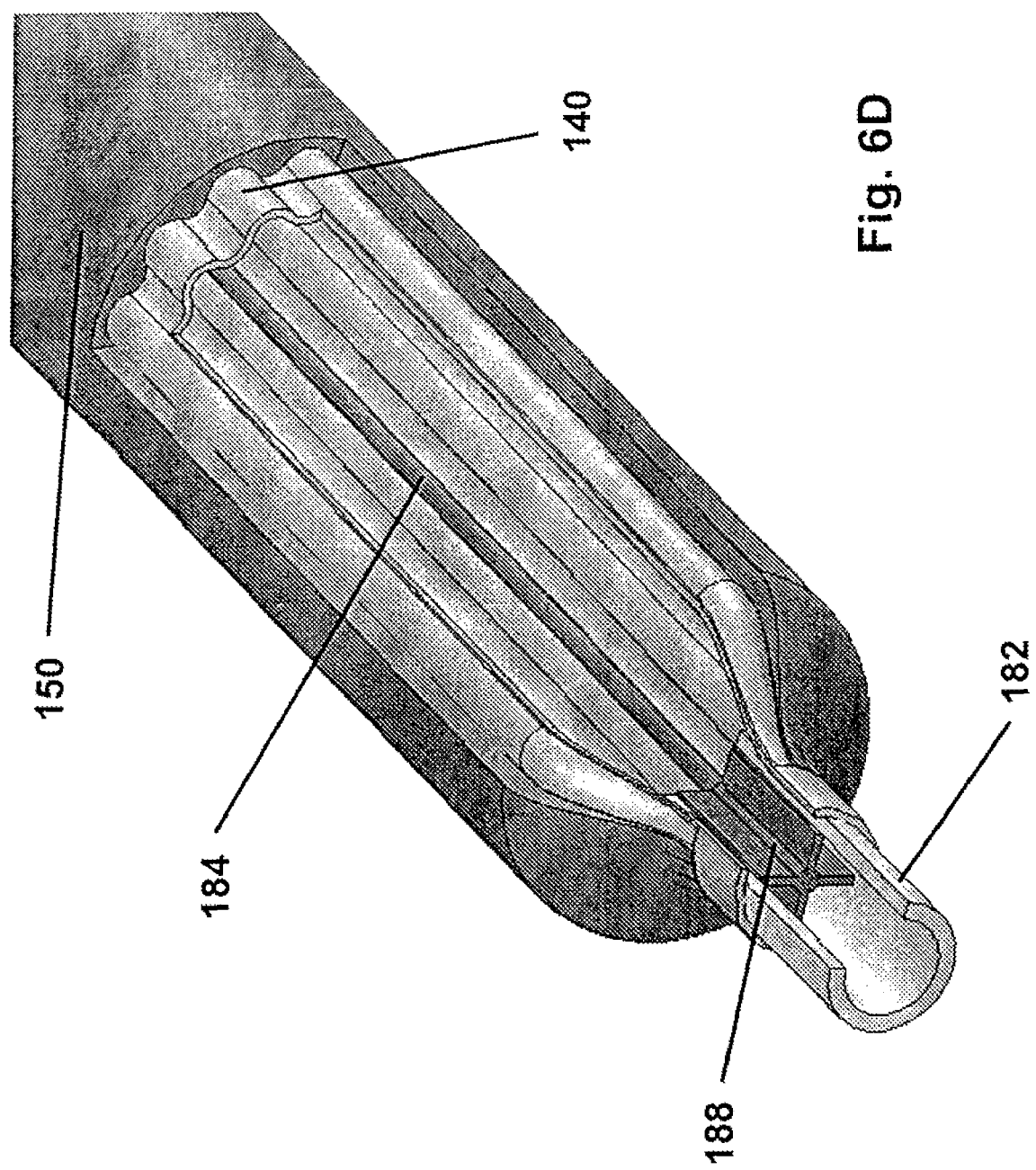

FIGS. 5A-F show another preferred embodiment of the invention. FIG. 5A shows the mandrel assembly wherein a removable convoluted mandrel 190 is assembled onto a perforated tube 180. The mandrel and the perforated tube will be made from different materials because the mandrel will eventually be removed while the perforated tube will remain to provide fluid connection to the apparatus and to support the axial loads imposed by the pressure. The mandrel 190 is coated with a removable shell 130 as shown in FIG. 5B. As in the previous embodiments this shell can be formed from a low-melting point metal such as Woods metal, a metal such as zinc which can be etched with an acid or a base, a hard wax, a low melting point plastic, a dissolvable plastic or any similar material which will allow the bladder to be formed over it and can then subsequently be removed from between the mandrel and the bladder by either heating the assembly to liquefy the shell material or by dissolving the shell in a solvent, or by etching the shell with an acid or a base. The shell must be removed in such a manner that the removable mandrel remains in place to allow controlled convolution of the bladder. This can be accomplished by using a different process to remove the shell 130 than will be used to remove the removable mandrel 190. For instance the shell could be removed by melting while the mandrel is removed by etching. An example of this process would be forming the center tube from 304 stainless steel, forming the mandrel from mild steel, and forming the shell from a low melting point zinc alloy. In this example the shell would be removed through the perforated mandrel by melting the shell. After convoluting the bladder 140 and overmolding the bladder cover 150, the mandrel 190 can be etched out through the center tube 180 using a hydrochloric acid solution. In this case the bladder would be formed from an elastomer which is inert to hydrochloric acid. The process could also utilize two materials with different melting points such as forming the mandrel from a fusible alloy and forming the shell from a hard wax. The wax could be removed after forming the bladder by heating the apparatus to a moderate temperature which would melt the wax but not melt the mandrel. After the bladder 140 is convoluted and the bladder cover 150 is overmolded onto the bladder, the mandrel 190 would then be removed by heating the apparatus to a higher temperature sufficient to melt the removable mandrel 190 but still low enough not to damage the bladder 140 or the overmolded bladder cover 150. Any combination of materials for the mandrel 190 and the shell 130 would be suitable if they allow layup of the bladder 140 in expanded form followed by removal of the shell 130, convolution of the bladder 140, overmolding of the resilient bladder cover 150, and finally removal of the mandrel 140.

Removal of the mandrel 190 allows the bladder 140 to be collapsed and inserted into a tubular through an entrance that is smaller than the tubular to be expanded. The bladder 140 can then be inflated and used to expand the tubular. The bladder assembly can subsequently be collapsed again and then be removed through the smaller opening. This process could be especially beneficial in certain heat exchanger repairs or in situations where oilfield casing is partially collapsed prior to expansion.

In another preferred embodiment of the present invention the axial load is supported by a flexible member such as a cable. The flexible member 184 is connected to both the inlet tube 182 and the end tube 186 with spider assemblies 188 as shown in FIG. 6A-D. A removable convoluted mandrel 190 surrounds the inlet tube, flexible member, and end tube. A removable shell 130 is molded over the removable mandrel 190. The bladder 140 is laid up as described above and the shell 130 is removed through the mandrel 190 and the inlet tube 182 by any one of the methods described previously. The bladder 140 is then convoluted around the mandrel 190 and the bladder cover 150 is overmolded onto the bladder 140. The mandrel 190 is then removed by one of the methods described previously. The bladder 140 can be further collapsed if necessary during installation and since the bladder 140 is flexible in its unexpanded configuration as is the flexible member 184, the apparatus can thereby be inserted in a tubular that has a bend such as a multipass heat exchanger.

Figure 7A:
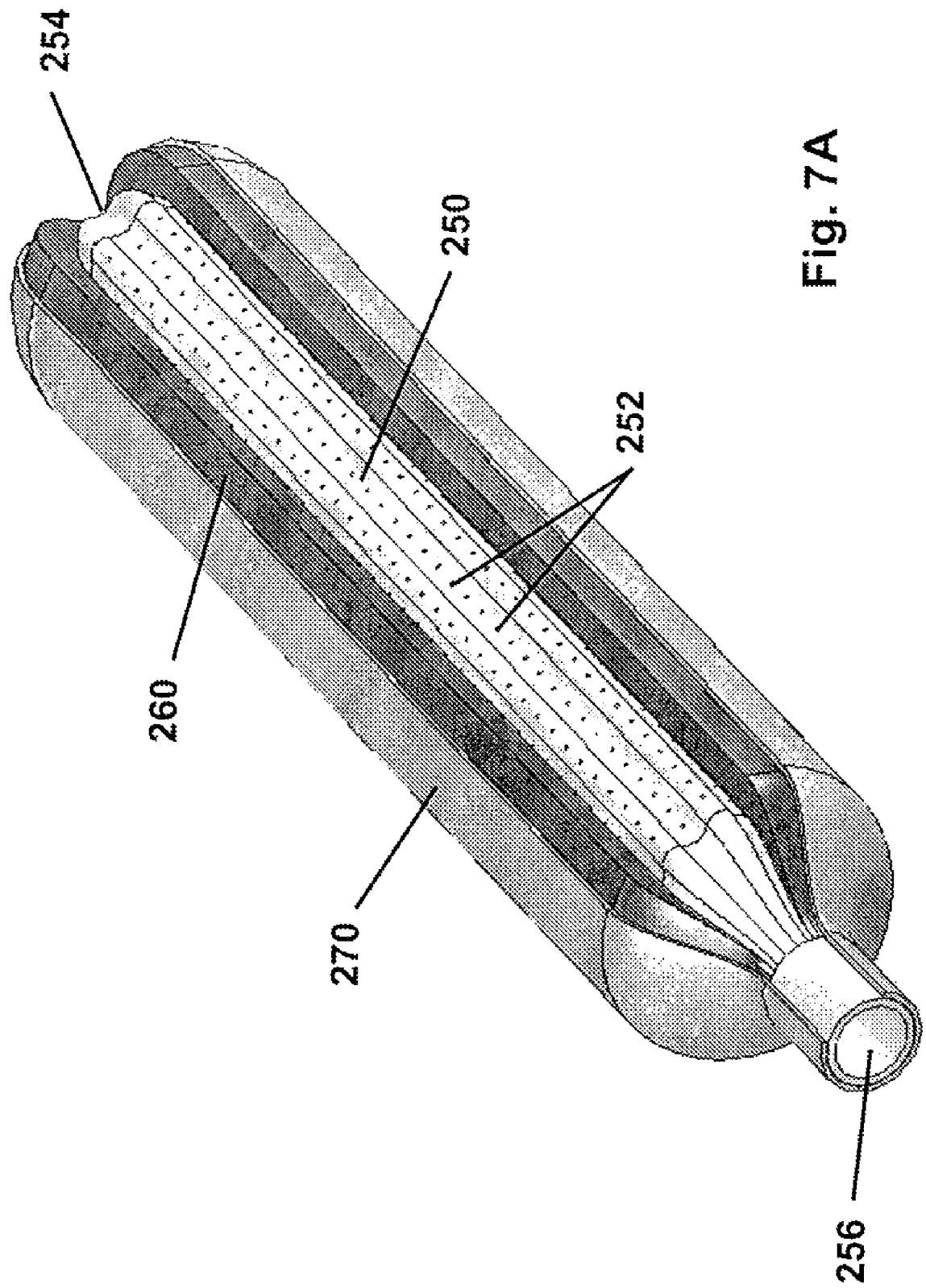

In an additional preferred embodiment of the present invention the axial load is supported by axial fibers in the bladder itself. In this embodiment, shown in FIGS. 7A-C, the mandrel 250 would be initially fabricated with an inlet tube 256 and either an outlet tube or, as shown in FIG. 7A, a closed end 254. The shell 260 would be overmolded onto the mandrel 250. The bladder 270 would be laid up onto the shell as described previously but in addition to the helically oriented reinforcement fibers, longitudinally oriented reinforcement fibers would be formed into bladder 270. The required number of the longitudinal fibers would be determined by the axial load to be carried during pressurization less the axial load carried by the helically oriented fibers. As shown in FIG. 7B, following layup of the axially reinforced bladder 270, the shell 260 would be removed and the bladder 270 would be convoluted against the mandrel 250. A bladder cover 280 would be overmolded onto the bladder 270 as described previously. FIG. 7C shows the apparatus after removal of the mandrel 250 by any of the methods described earlier. Remaining would be the axially reinforced bladder assembly consisting of the axially and helically reinforced resilient bladder 270 and the bladder cover 280. An inlet tube 182 is inserted into the open end of the bladder assembly and is sealed to the bladder 270 by clamping and sealing methods known in the industry. If a second open end is provided rather than the closed end shown in FIG. 7A, an end tube is inserted into the second end of the bladder 270 and sealed in a similar manner to the inlet tube. This embodiment would provide a more flexible apparatus which could be inserted into tubulars with restricted access.

FIGS. 8A-B show an additional preferred embodiment of the invention wherein the tubular to be expanded 330 is convoluted. In this embodiment the convoluted mandrel 120 is constructed such that the convolutions 122 of the mandrel 120 correspond one to one to the convolutions 332 of the tubular 330 to be expanded having the same number of convolutes and having the proper amplitude such that the bladder 140 will substantially pressurize the convoluted tubular 330 uniformly during expansion. In this embodiment the fabrication of the bladder assembly is essentially the same as demonstrated in FIGS. 3A-D, wherein the removable shell 130 will be formed over said mandrel 120 to the dimensions of the bladder in its expanded form and the bladder 140 will be laid up over the shell 130 wherein the bladder has reinforcing fibers in a resilient matrix. The matrix may be fully cured or only partially cured at this point. The removable shell 130 is removed by any of the methods described previously. If the bladder 140 has been fully cured prior to removal of the shell, the bladder 140 must be convoluted against the convoluted mandrel 120 by applying a vacuum to the underside of the bladder 140 through the mandrel 120. This vacuum would be held during insertion of the apparatus into the convoluted tubular 330 to be expanded. After expansion of the tubular, a vacuum would once again be applied to the bladder 140 to allow movement of the apparatus into another section of convoluted tubular 330 to be expanded or to allow removal of the apparatus.

Alternatively, if the resilient matrix is only partially cured prior to removal of the shell 130, the bladder 140 can be convoluted against the mandrel 120 by either internal vacuum or external pressure, and the resilient matrix can be further cured in this configuration allowing the apparatus to be inserted, moved and removed without having to maintain a vacuum on the apparatus.

Figure 9:
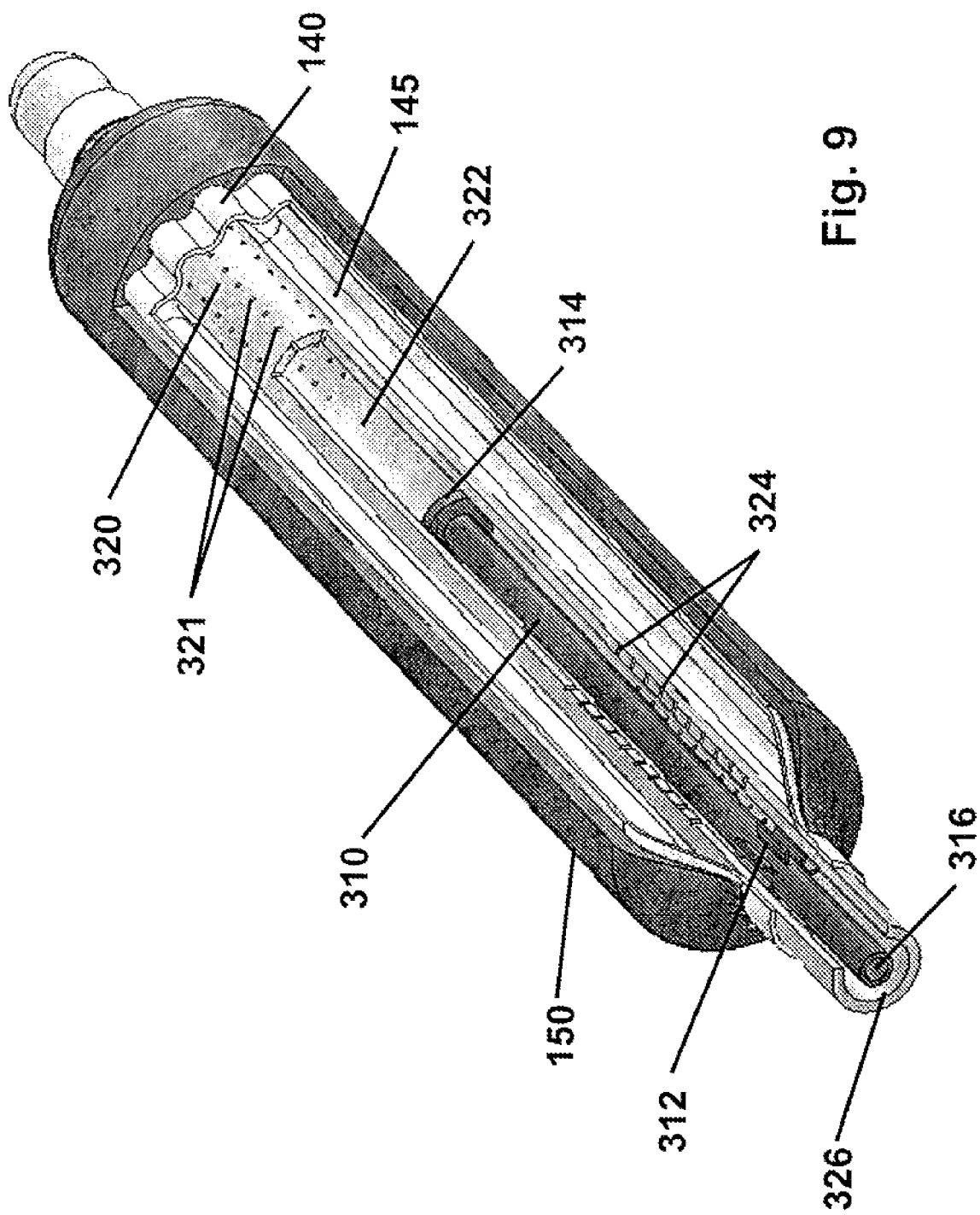
FIG. 9 is a sectioned isometric view depicting the fabrication of a preferred embodiment of the invention which consists of a perforated center tube, a convoluted reinforced resilient bladder and an overmolded resilient covering configuration with a tube inside the perforated center tube which allows circulation of a either a heated or cooled fluid underneath the bladder.

A further preferred embodiment of the present invention is shown in FIG. 9. The center tube 320 contains an inner tube 310 having an inlet 316 that provides fluid communication directly to the distal end 322 of the center tube, through the holes 321 in the distal end of the center tube 320 and into the plenum 145 between the center tube 320 and the bladder 140. A spider arrangement 312 and a centering flange 314 align the inner tube 310 with the center tube 320. The fluid must then flow between the bladder and the center tube and exits through the holes 324 in the center tube at the inlet end of the apparatus and into the annulus 326 between the center tube and the inner tube. The inlet path for the fluid would not matter for a normal expansion, but this configuration allows for a flow of fluid along the inner surface of the bladder in the annulus 145. If the fluid is hotter or colder than the tubular to be expanded, this allows heat transfer to or from the tubular.

Two scenarios are envisioned where this could be of value. In order to seal the expanded tubular to the tubular that is being repaired, often an epoxy coating is applied to the exterior of the tubing to be expanded such that the epoxy coating will form a seal between the tubular being expanded and the tubular that is being repaired. Once the two tubulars are brought into contact by the expansion of the inner tubular, a warm fluid can be circulated through the apparatus heating the inner tubular and the epoxy coating and thus accelerating the curing of the seal.

Another aspect of this embodiment involves the circulation of cold fluid through the bladder during the expansion process. This cools the tubular to be expanded. The cooled tubular is expanded inside the tubular to be repaired and slightly expands the tubular being repaired. When the bladder is depressurized, both tubulars elastically recover. Since the inner tubular is cooler than the outer tubular, the inner tubular will expand as it comes into thermal equilibrium with the outer tubular increasing the contact between the inner tubular and the outer tubular.

A further advantage of the present invention is the ability to use the expansion device to insert the tubular to be expanded. This process is especially applicable to the insertion of a casing string into a wellbore. The lengths of casing can be assembled in the normal manner and welded together at the surface. When the required length of casing string is completed, the expansion apparatus can be inserted into the top end of the casing string and pressurized to a pressure adequate to support the casing string due to the frictional force between the bladder and the inside surface of the casing but at a pressure less than that needed to expand the casing. For example a 1000 foot string of 18 inch diameter 0.5 inch wall casing weighs approximately 97,000 pounds but the friction on the surface of a 10 foot long expansion device pressurized to 1000 psi would support 680,000 pounds based upon a friction coefficient of 0.1 and the wall stresses in the bladder would be only 10% of the stresses supported during the expansion of the casing. After the casing string is lowered to the proper depth, the expansion apparatus can be further pressurized to expand the top of the casing against the existing casing string, locking it into place. The expansion apparatus can then be depressurized and lowered into the unexpanded section of the casing. Each successive section of casing can then be expanded until the full length of the casing string has been expanded after which the expansion apparatus can be withdrawn and returned to the surface.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for the controlled expansion of a tube segment comprising:
    (a) a structural element having an elongated shape for insertion into said tube segment,
    (b) a convoluted bladder formed from a fluid impervious material having reinforcing fibers formed integrally with said bladder, said bladder being sealed against the first and second ends of said structural element such that pressurized fluid injected into said bladder from one of said ends can expand said bladder up to a controlled diameter determined by said reinforcing fibers, (c) wherein the apparatus is arranged such that a yield strength of the bladder is sufficient to support an internal hydraulic pressure necessary to controllably force plastic expansion of a tube segment into which the apparatus has been inserted without rupture or damage of either the apparatus or the tube segment.

2. An apparatus for the controlled expansion of a tube segment of claim 1 further comprising an expandable cover layer surrounding said bladder to maintain said bladder at a reduced diameter until said bladder is expanded by introduction of said pressurized fluid.

3. An apparatus for the controlled expansion of a tube segment of claim 2 wherein said structural element further comprises a perforated mandrel wherein pressurized fluid injected into said mandrel will flow through the perforations in said mandrel and expand said bladder.

4. An apparatus for the controlled expansion of a tube segment of claim 2 wherein said structural element further comprises a flexible member so that said apparatus can be inserted through curved tube segments in an assembly of tube sections having both straight and curved sections.

5. An apparatus for the controlled expansion of a tube segment of claim 4 wherein said structural element further comprises spider assemblies attached to said flexible member so that said bladder can be sealingly attached to said structural element.

6. An apparatus for the controlled expansion of a tube segment of claim 1 wherein said structural element further comprises a perforated inner tube wherein pressurized fluid injected into said tube will flow through the perforations in said inner tube and expand said bladder which is sealingly attached to said inner tube.

7. An apparatus for the controlled expansion of a tube segment of claim 6 wherein said structural element further comprises a perforated outer tube positioned within said bladder which is sealingly attached to said outer tube, wherein when said inner tube is injected with fluid, said fluid will flow through perforations in said inner tube towards linearly displaced perforations in said outer tube in order to provide a heat transfer effect across said bladder.

8. An apparatus for the controlled expansion of a tubular comprising:
(a) a hollow mandrel, said mandrel comprising:
    i) a first cylindrical end, said first cylindrical end providing a connection to a fluid source;
    ii) a central convoluted section; and
    iii) a second cylindrical end,
    wherein the central convoluted section of said mandrel is perforated, said perforations to allow for fluid communication between the hollow mandrel and an exterior surface of said central convoluted section of said mandrel, and
(b) a bladder surrounding said mandrel wherein said bladder is formed from a material having reinforcing fibers formed integrally with said bladder, said bladder being sealed against the first and second ends of said mandrel such that pressurized fluid injected into said mandrel will flow through the perforations in said mandrel and expand said bladder up to a controlled diameter determined by said reinforcing fibers, wherein the yield strength of the bladder is sufficient to support an internal hydraulic pressure necessary to controllably force plastic expansion of a tube segment into which the apparatus has been inserted without rupture and damage of either the apparatus or the tube segment.

9. An apparatus for the controlled expansion of a tubular of claim 8 further comprising an expandable cover layer surrounding said bladder to maintain said bladder at a reduced diameter until said bladder is expanded by said pressurized fluid.

10. An apparatus for the controlled expansion of a tubular of claim 9 wherein said pressurized fluid comprises hydraulic fluid.

11. An apparatus for the controlled expansion of a tubular of claim 9 wherein said pressurized fluid comprises a gas.

12. An apparatus for the controlled expansion of a tubular of claim 8 wherein said bladder is comprised of a fiber impregnated layer of resilient fluid impervious material.

13. An apparatus for the controlled expansion of a tubular of claim 8 wherein said bladder is comprised of multiple layers of reinforcing fibers including fluid impervious material.

14. An apparatus for the controlled expansion of a tubular of claim 13 wherein said bladder further comprises release material between multiple layers to permit relative movement between said layers.

15. A method of fabricating a tubular expansion device comprising the steps of:
(a) positioning a convoluted perforated mandrel around a structural element,
(b) forming a bladder onto said mandrel, said bladder having reinforcing fibers formed integrally therewith,
(c) sealing the bladder at its ends against said structural element,
(d) forming an outer cover around a bladder, and
(e) removing said convoluted mandrel between the structural element and the bladder,
wherein a yield strength of the bladder is sufficient to support an internal hydraulic pressure necessary to controllably force plastic expansion of a tube segment into which the tubular expansion device has been inserted without rupture or damage of either the apparatus or the tube segment.

16. The method of fabricating a tubular expansion device of claim 15 further comprising the step of introducing a vacuum into said mandrel prior to forming an outer cover in order to draw said bladder onto said convoluted mandrel.

17. The method of fabricating a tubular expansion device of claim 15 wherein said structural element further comprises a perforated inner tube wherein pressurized fluid injected into said tube will flow through the perforations in said inner tube and expand said bladder which is sealingly attached to said inner tube.

18. The method of fabricating a tubular expansion device of claim 15 wherein said structural element further comprises a flexible member so that said apparatus can be inserted through curved tube segments in an assembly of tube sections having both straight and curved sections.

19. A method of fabricating a tubular expansion device comprising the steps of:
(a) forming a removable shell around a perforated convoluted mandrel,
(b) forming a bladder onto said convoluted mandrel and removable shell at an expanded configuration of said bladder, said bladder having reinforcing fibers formed integrally therewith,
(c) sealing said bladder at its ends against said convoluted mandrel,
(d) removing said shell from between said convoluted mandrel and the bladder,
(e) convoluting the bladder against the convoluted mandrel, and
(f) maintaining the bladder in its convoluted form, wherein a yield strength of the bladder is sufficient to support an internal hydraulic pressure necessary to controllably force plastic expansion of a tube segment into which the tubular expansion device has been inserted without rupture or damage of either the apparatus or the tube segment.

20. The method of fabricating a tubular expansion device of claim 19 further comprising the step of:
   forming a cover layer of said bladder to maintain said bladder in its convoluted form until pressurized.

21. The method of fabricating a tubular expansion device of claim 20 wherein the step of convoluting the bladder further comprises the step of introducing a vacuum into said convoluted mandrel prior to forming an outer cover in order to draw said bladder onto said convoluted mandrel.

22. The method of fabricating a tubular expansion device of claim 19 further comprising the step of:
   incorporating reinforcing fibers into said bladder in order to strengthen said bladder and to limit potential expansion of said bladder.

23. A method of controllably expanding tubular pipe segments comprising the steps of:
   (a) inserting an expandable fiber reinforced bladder into a tubular pipe segment, the bladder being formed from a fluid impervious material having reinforcing fibers formed integrally with said bladder, wherein a yield strength of the bladder is sufficient to support an internal hydraulic pressure necessary to controllably force plastic expansion of the tubular pipe segment without rupture or damage of either the apparatus or the tube segment;
   (b) pressurizing the interior of said bladder with a pressurized fluid to expand said bladder up to a controlled diameter determined by said reinforcing fibers;
   (c) using said pressurized bladder to plastically deform said tubular pipe segment in a generally cylindrical manner;
   (d) releasing said pressurized fluid from said bladder; and
   (e) removing said expandable fiber reinforced bladder from said tubular pipe segment.

24. The method of controllably expanding tubular pipe segments of claim 23 further comprising the step of providing a temperature controlled fluid in order to utilize said bladder as a heat transfer element to the tubular pipe segment.

25. The method of controllably expanding tubular pipe segments of claim 24 further wherein use of said bladder as a heat transfer element to the tubular pipe segment is provided to cure adhesives positioned between said tubular pipe segment and a surrounding surface.

26. The method of controllably expanding tubular pipe segments of claim 23 further comprising the step of partially expanding said bladder in order to restrain said expandable pipe segment and to enable it to be positioned within a structure of larger diameter pipe.

27. An apparatus for the controlled expansion of a tube segment comprising:
   (a) a convoluted bladder formed from a fluid impervious material having reinforcing fibers formed integrally with said bladder, said bladder being sealed such that pressurized fluid injected into said bladder can expand said bladder up to a controlled diameter determined by said reinforcing fibers, and
   (b) a structural element surrounded by said bladder, the structural element having convolutions matched to those of said convoluted bladder, wherein a yield strength of the bladder is sufficient to support an internal hydraulic pressure necessary to controllably force plastic expansion of a tube segment into which the apparatus has been inserted without rupture and damage of either the apparatus or the tube segment.

* * * * *